(12) United States Patent
Tomoda et al.

(10) Patent No.: US 8,015,895 B2
(45) Date of Patent: Sep. 13, 2011

(54) GEAR SHIFT DEVICE

(75) Inventors: Akihiko Tomoda, Fujimi (JP); Yoshiaki Tsukada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 328 days.

(21) Appl. No.: 12/443,300

(22) PCT Filed: Sep. 27, 2007

(86) PCT No.: PCT/JP2007/068835
§ 371 (c)(1),
(2), (4) Date: Mar. 27, 2009

(87) PCT Pub. No.: WO2008/038724
PCT Pub. Date: Apr. 3, 2008

(65) Prior Publication Data
US 2010/0107796 A1    May 6, 2010

(30) Foreign Application Priority Data

Sep. 29, 2006  (JP) ................. P2006-270103

(51) Int. Cl.
*B60K 20/00*    (2006.01)
*F16H 59/04*    (2006.01)

(52) U.S. Cl. .................................. 74/473.36

(58) Field of Classification Search ........... 74/473.36, 74/473.37, 415, 425, 424.5, 473.1
See application file for complete search history.

(56) References Cited

U.S. PATENT DOCUMENTS

| 2,525,240 | A | * | 10/1950 | Pierce .................. 114/155 |
| 3,049,017 | A | * | 8/1962 | McDonald et al. ........ 74/84 R |
| 5,975,395 | A | | 11/1999 | Takada et al. |
| 2005/0081664 | A1 | | 4/2005 | Kawakubo et al. |
| 2005/0194964 | A1 | | 9/2005 | Okada et al. |
| 2009/0084633 | A1 | * | 4/2009 | Fujimoto et al. .......... 184/6.5 |

(Continued)

FOREIGN PATENT DOCUMENTS

EP    0187117 A2    7/1986

(Continued)

OTHER PUBLICATIONS

Notice of Allowance, Japanese Application No. 2006-270103, Jul. 12, 2011.

*Primary Examiner* — Justin Krause
(74) *Attorney, Agent, or Firm* — Arent Fox LLP

(57) ABSTRACT

This gear shift device is used in a transmission of an engine, and is provided with: a shift drum that changes a speed change stage of the transmission according to a rotational position about an axis; an actuator having a driving shaft substantially orthogonal to the shift drum; a worm shaped barrel cam that is arranged parallel to the driving shaft of the actuator and that has a plurality of cam grooves on an outer circumference thereof; and a wheel gear that is coaxially fixed on the shift drum and that has a plurality of pins on an outer circumference thereof. At least a pair of each pin of the wheel gear and each cam groove of the barrel cam are engaged with each other, and the shift drum is rotated by the actuator via the barrel cam and the wheel gear, to thereby change the speed change stage of the transmission. The gear shift device is further with a detection device that detects a rotational position of the barrel cam.

2 Claims, 19 Drawing Sheets

U.S. PATENT DOCUMENTS

| | | | |
|---|---|---|---|
| 2009/0165545 A1* | 7/2009 | Fujimoto et al. | 73/115.02 |
| 2010/0000363 A1* | 1/2010 | Tomoda et al. | 74/473.36 |

FOREIGN PATENT DOCUMENTS

| | | | |
|---|---|---|---|
| FR | 1327537 A | 5/1963 |
| JP | 11-82734 A | 7/1989 |
| JP | 05-039865 A | 2/1993 |
| JP | 08-035553 A | 2/1996 |
| JP | 11-135987 A | 5/1999 |
| JP | 2001-050389 A | 2/2001 |
| JP | 2005-042844 A | 2/2005 |
| JP | 2005-249488 A | 9/2005 |
| JP | 2006-029420 A | 2/2006 |

* cited by examiner

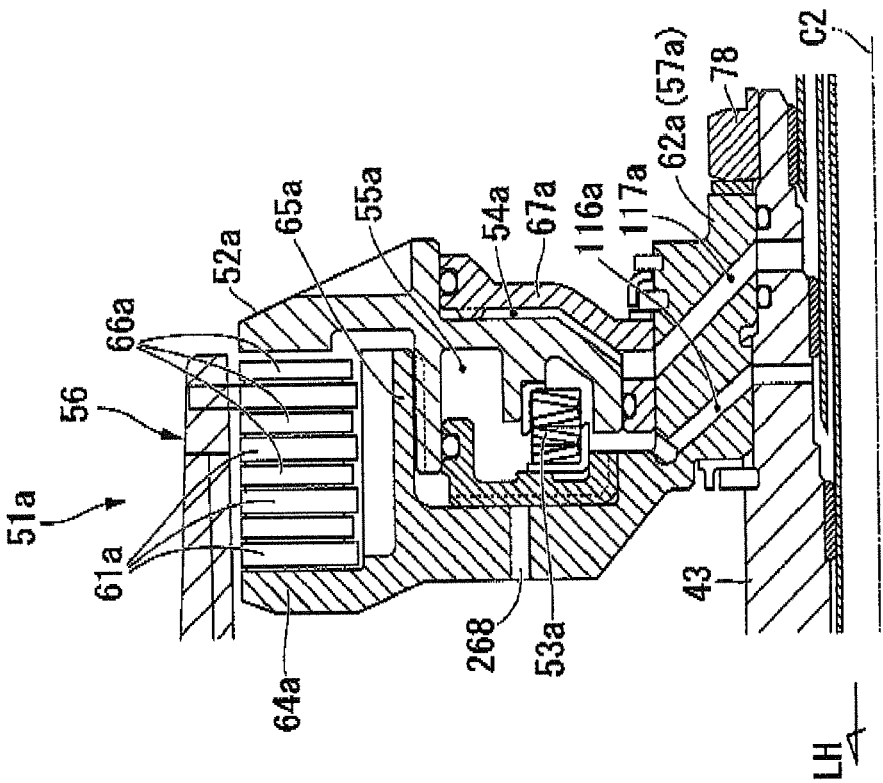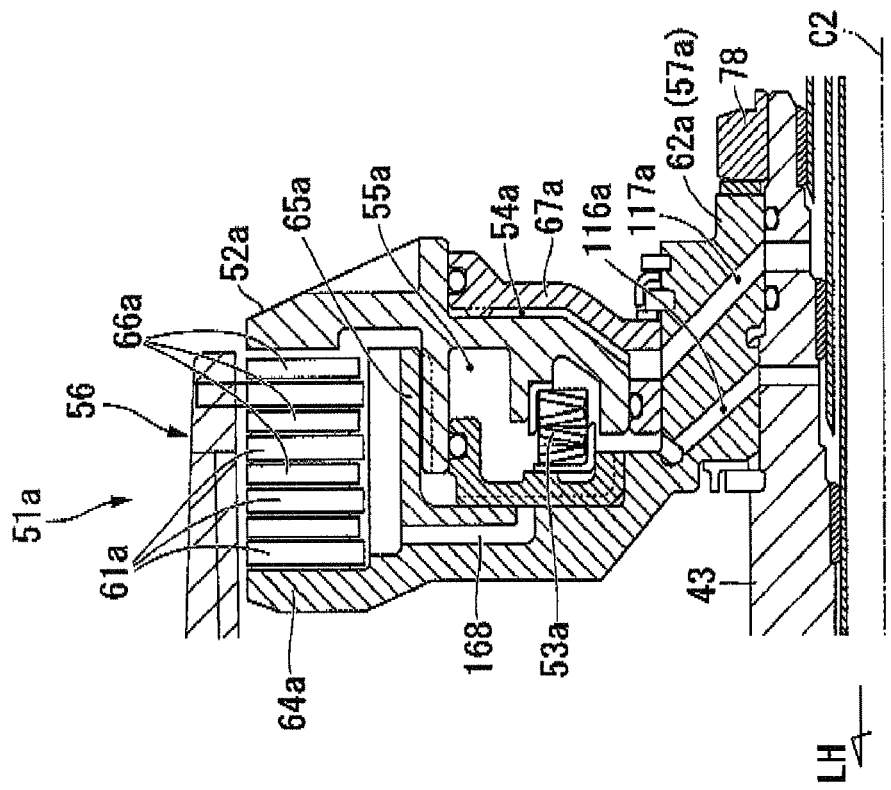

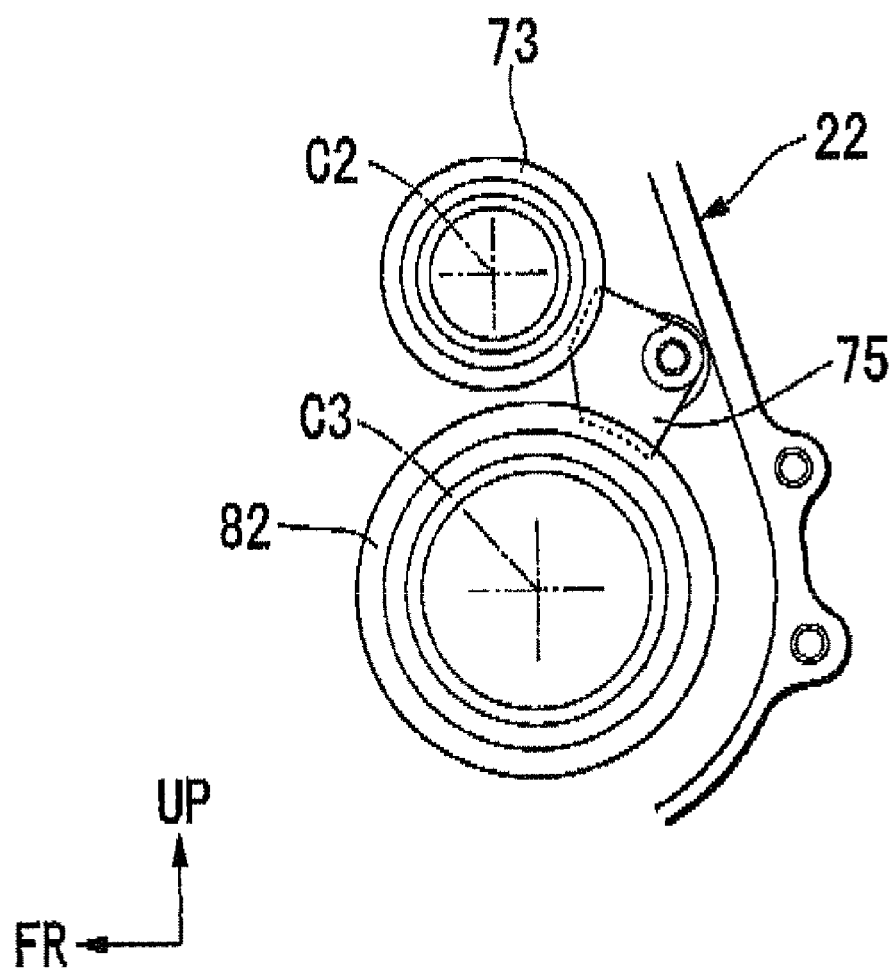

| REGION | FIRST SWITCH | SECOND SWITCH |
|---|---|---|
| STOP | ON | ON |
| CCW CORRECTION | OFF | ON |
| FEED | OFF | OFF |
| CW CORRECTION | ON | OFF |

| REGION | MOTOR TORQUE |
|---|---|
| STOP | 0 |
| CCW CORRECTION | $-T_{min}$ |
| FEED | $\pm T_{max}$ |
| CW CORRECTION | $+T_{min}$ |

GEAR SHIFT DEVICE

CROSS-REFERENCE TO RELATED APPLICATION

This application is a National Stage entry of International Application No. PCT/JP2007/068835, filed Sep. 27, 2007, which claims priority to Japanese patent Application No. P2006-270103, filed on Sep. 29, 2006, the disclosure of the prior applications is hereby incorporated in their entirety by reference.

TECHNICAL FIELD

The present invention relates to a gear shift device to be used in a transmission of an engine of a vehicle or the like.

The present application is based on Japanese Patent Application, No. 2006-270103, the contents of which axe incorporated herein by reference.

BACKGROUND ART

Heretofore, there has been a gear shift device in which a shift drum that changes a speed change stage of a transmission according to a rotational position about an axis, is rotated by an actuator with a driving shaft thereof arranged parallel to this shift drum, to thereby change the speed change stage of the transmission (for example, refer to Patent Document 1).

[Patent Document 1] Japanese Unexamined Patent Application, First Publication No. H11-82734

DISCLOSURE OF INVENTION

Problems to be Solved by the Invention

Incidentally, in the above conventional technique, in order to directly detect the rotational position of the shift drum, a potentiometer is provided on one end side thereof. However since this potentiometer is comparatively expensive, there is the problem of increased cost.

Consequently, it is an object of the present invention to efficiently detect the rotational position of the shift drum while keeping cost down, in a gear shift device used in a transmission of an engine of a vehicle or the like.

Means for Solving the Problems

In order to resolve the above problems, the present invention employs the following measures.
(1) That is to say, a gear shift device of the present invention is used in a transmission of an engine, and is provided with: a shift drum that changes a speed change stage of the transmission according to a rotational position about an axis; an actuator having a driving shaft substantially orthogonal to the shift drum; a worm shaped barrel cam that is arranged parallel to the driving shaft of the actuator and that has a plurality of cam grooves on an outer circumference thereof, and a wheel gear that is coaxially fixed on the shift drum and that has a plurality of pins on an outer circumference thereof. At least a pair of each pin of the wheel gear and each cam groove of the barrel cam are engaged with each other, and the shift drum is rotated by the actuator via the barrel cam and the wheel gear, to thereby change the speed change stage of the transmission. The gear shift device is further with a detection device that detects a rotational position of the barrel cam. The detection device has a cam provided integral with an outer circumference of the barrel cam.
(2) There may be employed a configuration in which the detection device has two independent sensors corresponding to the cam, which are arranged with a predetermined phase difference along a rotational direction of the barrel cam.

Effects of the Invention

According to the invention described in (1) above, by detecting the rotational position of the shift drum from the rotational position of the worm shaped barrel cam, the rotational position of the shift drum can be detected efficiently without using an expensive sensor.

In addition, by arranging the detection devices with a predetermined phase difference in the barrel cam rotational direction, it is possible to accurately detect if the barrel cam has rotated to the shift up side or the shift down side, or if shift up or shift down has been completed.

BRIEF DESCRIPTION OF THE DRAWINGS

FIG. 7A is a sectional view corresponding to a part of FIG. 6, showing a first modified example of an oil feed passage to a clutch disk of the twin clutch.

FIG. 7B is a sectional view corresponding to a part of FIG. 6, showing a second modified example of an oil feed passage to the clutch disk of the twin clutch.

FIG. 8 is a side view of a bearing holder that holds, on the left side of a mission case, ball bearings for supporting the left end section of each shaft of the twin clutch transmission.

DESCRIPTION OF THE REFERENCE SYMBOLS

Figure 1:
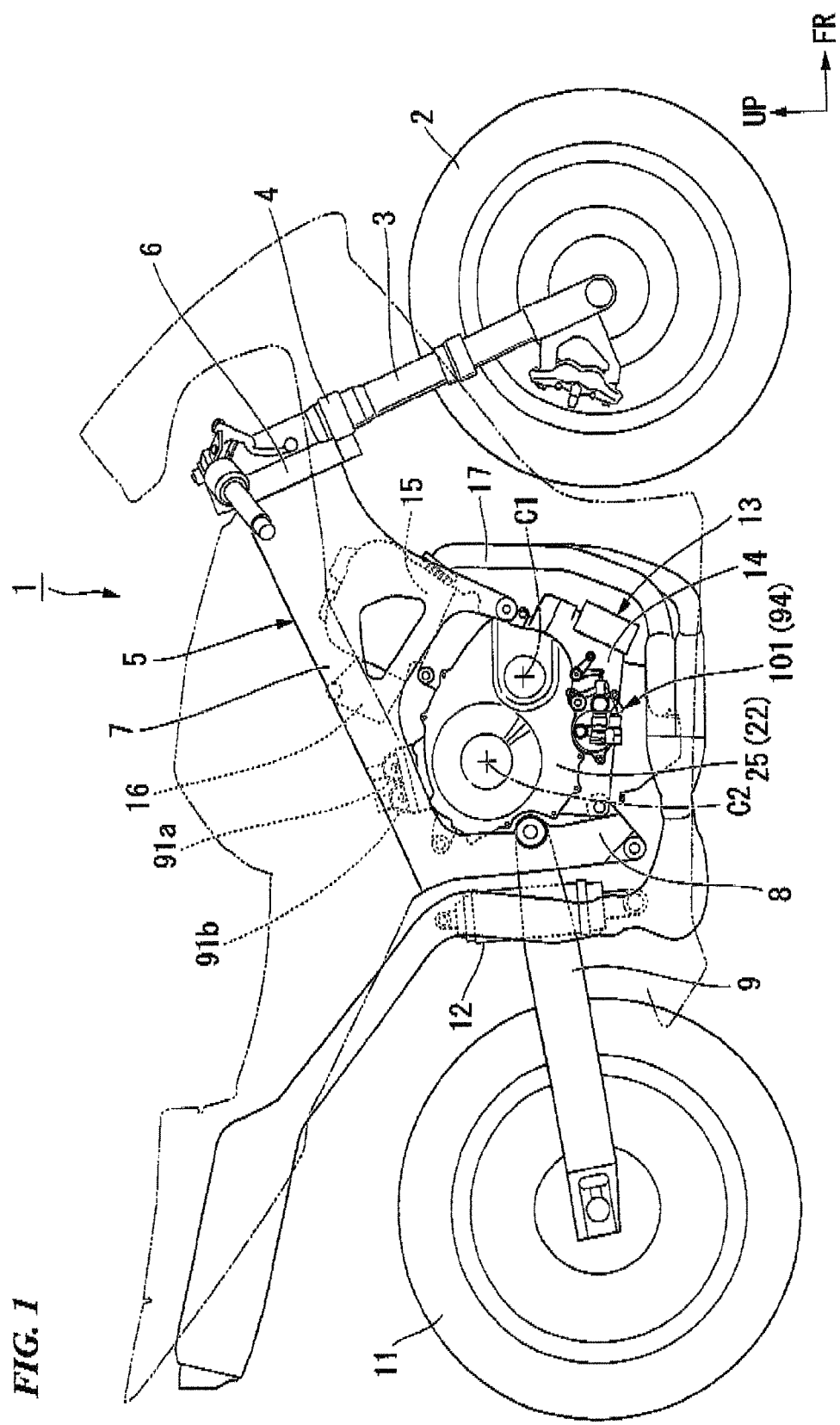
FIG. 1 is a right side view of a motorcycle in an embodiment of the present invention.

1 Motorcycle (saddle riding type vehicle)
13 Engine
23 Twin clutch transmission (transmission)
24a Shift drum
41 Gear shift device
121 Fin gear (wheel gear)
121a Pin
122 Barrel cam
124 Electric motor (actuator)
125 Driving shaft
129 Cam groove
131 Switch cam (detection device)
133 First switch (detection device)
134 Second switch (detection device)

BEST MODE FOR CARRYING OUT THE INVENTION

Hereunder an embodiment of the present invention is described, with reference to the drawings. In the following description, orientations including front-rear/left-right orientations are the same as orientations in a vehicle unless particularly mentioned. Moreover, in the drawings, the arrow FR points to the front side of the vehicle, the arrow LH points to the left side of the vehicle, and the arrow UP points to the upside of the vehicle.

As shown in FIG. 1, an upper section of a front fork 3 that pivotally supports a front wheel 2 of a motorcycle (saddle riding type vehicle) 1, is steerably pivot-supported via a steering stem 4, on a head pipe 6 of a front end section of a vehicle body frame 5. A main frame 7 extends rearward from the head pipe 6 and connects with a pivot plate 8. On the pivot plate 8 there is vertically swingably pivot-supported the front end section of a swing arm 9, and on the rear end section of this swing arm 9 there is pivotally supported a rear wheel 11. Between the swing arm 9 and the vehicle body frame 5 there is interveningly provided a cushion unit 12. On the vehicle body frame 5 there is mounted an engine (internal combustion engine) 13 that serves as a motor of the motorcycle 1.

Figure 2:
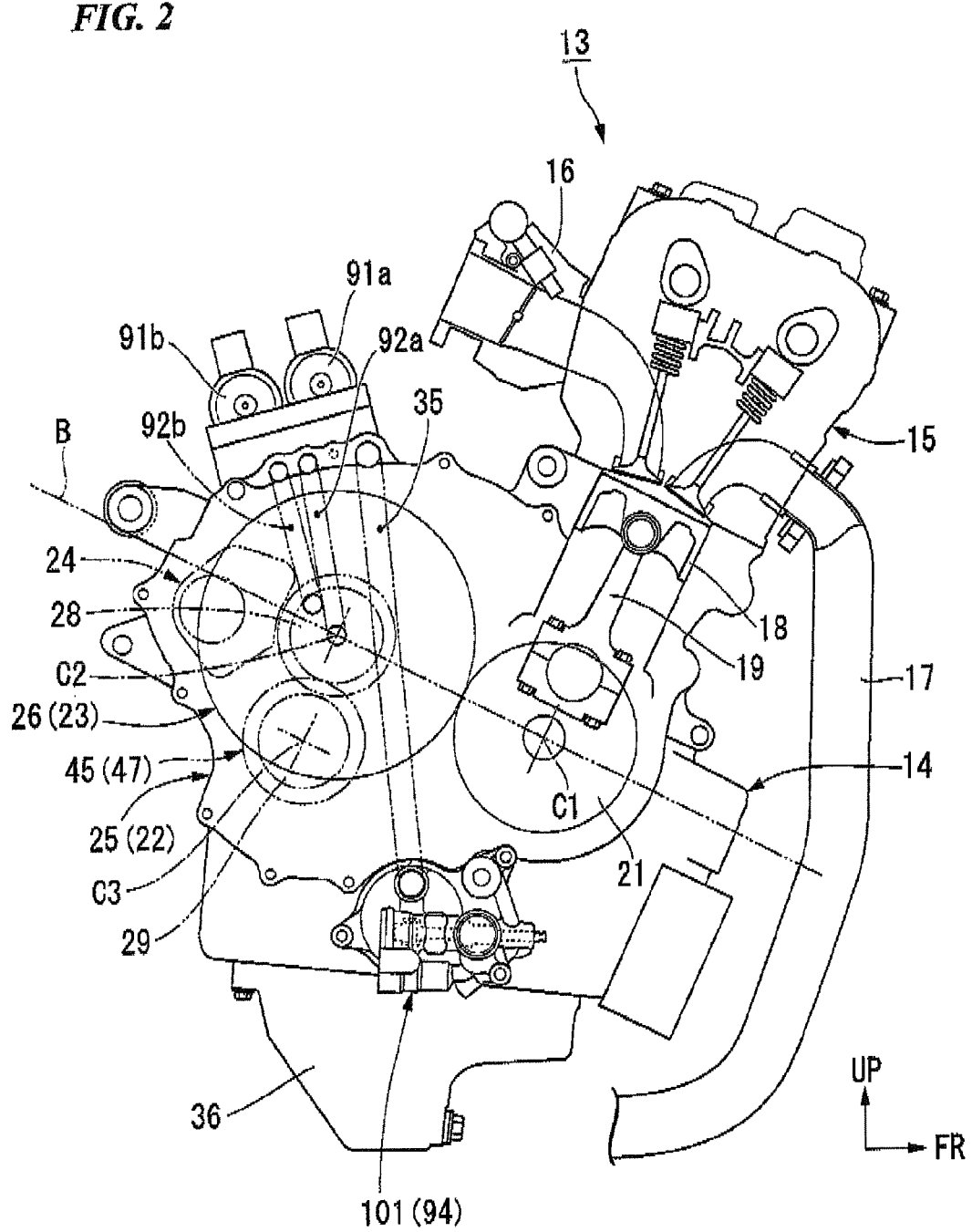
FIG. 2 is a right side view of an engine of the motorcycle.

Also making reference to FIG. 2, the engine 13 is a parallel four-cylinder engine with a crank shaft axis C1 thereof along the vehicle width direction (left-right direction), and on a crank case 14 thereof there is provided a cylinder section 15 standing upright. To the rear section of this cylinder section 15 there is connected a throttle body 16 of an induction system, and to the front section there is connected an exhaust pipe 17. Inside the cylinder section 15 there are reciprocatably fitted pistons 18 corresponding to respective cylinders, and reciprocation of these pistons 18 is converted, via connecting rods 19, to rotation of a crank shaft 21.

Figure 3:
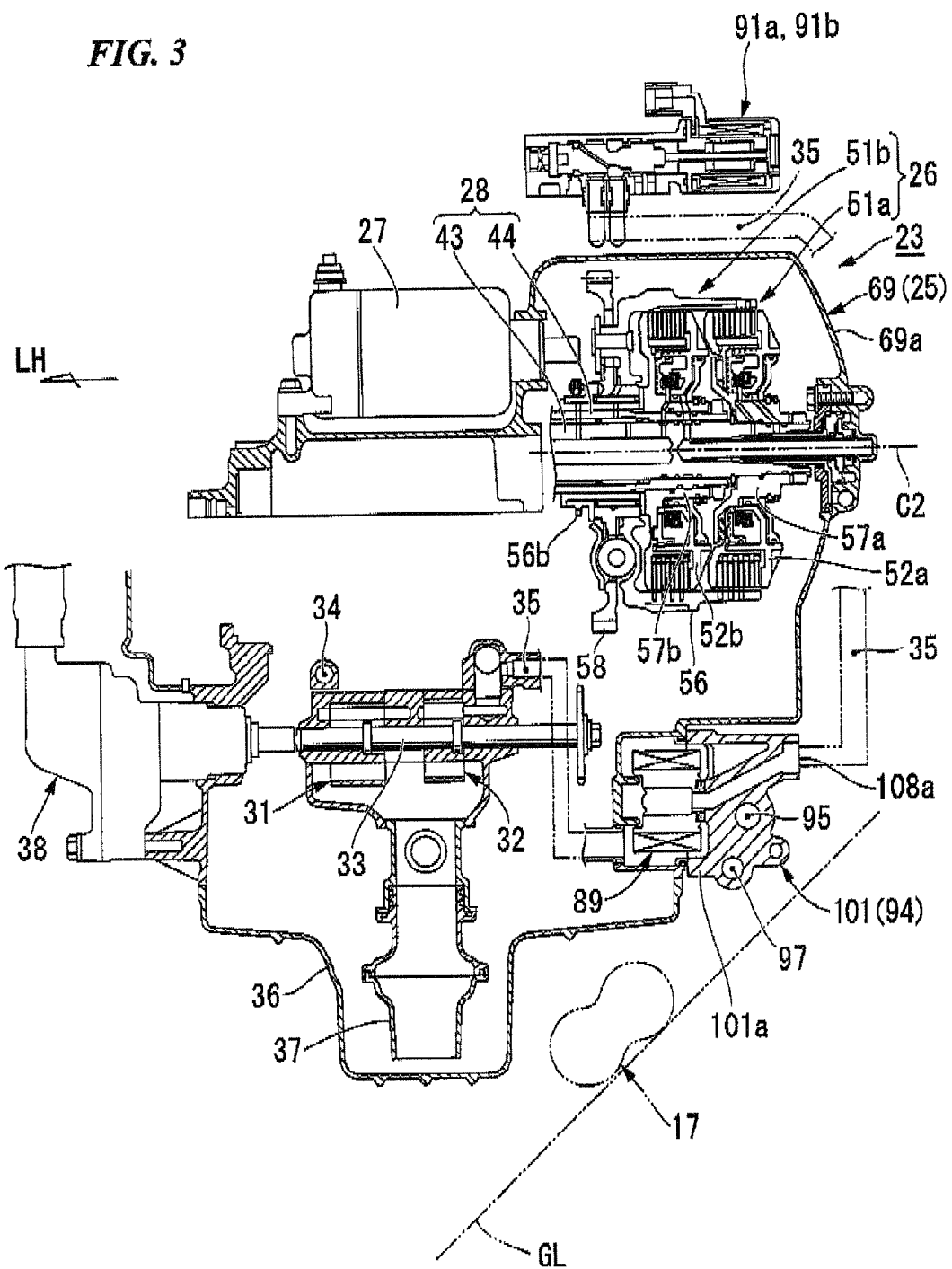
FIG. 3 is a drawing showing a relevant section of the engine, being a sectional view parallelly developed in the left-right direction.

Also making reference to FIG. 3, to the rear of the crank case 14 there is integrally connected a mission case 22, and inside this mission case 22 there are housed a twin clutch transmission 23 and a change mechanism 24. The right side section of the mission case 22 serves as a clutch case 25, and inside this clutch case 25 there is housed a twin clutch 26 of the twin clutch transmission 23. On the mission case 22 there is arranged a starter motor 27 (refer to FIG. 3). A rotational force of the crank shaft 21 is output, via the twin clutch transmission 23, to the left side of the mission case 22, and is then transmitted, for example via a chain type power transmission mechanism, to the rear wheel 11.

As shown in FIG. 2 the engine 13 is configured such that three main shafts, namely the crank shaft 21, a main shaft 28 in the twin clutch transmission 23 parallel to the crank shaft 21, and a counter shaft 29, are in a triangular arrangement. Specifically, the axes C1 and C2 of the crank shaft 21 and the main shaft 28 are arranged on a rear-rising upper/lower dividing plane B in the crank case 14, and the axis C3 of the counter shaft 29 is arranged below the dividing plane B and on the rear side on the crank shaft 21. Thus, the front-rear length of the engine 13 is reduced, and the level of freedom of the layout of the engine 13 can be increased. On the rear side and slightly upper side of the main shaft 28 there is arranged the change mechanism 24.

As shown in FIG. 3, on the inner side of the lower section of the crank case 14 there are arranged first and second oil pumps 31 and 32 that share a driving shaft 33 along the left-right direction. The first oil pump 31 serves to pressure-feed oil into respective sections in the engine, and a discharge port thereof is connected, via a main oil feed passage 34, to a main oil gallery (not shown in the drawing). On the other hand, the second oil pump 32 serves to generate hydraulic pressure for operating the twin clutch 26, and a discharge port thereof is connected to an oil feed passage 35 to the twin clutch 26. Reference symbol 37 denotes a strainer that extends downward from the respective oil pumps 31 and 32 to be immersed in engine oil in an oil pan 36 below the crank case 14, and reference symbol 38 denotes a water pump that is arranged on the right side of the lower section of the crank case 14 and that has a driving shaft coaxial with the respective oil pumps 31 and 32.

Figure 5:
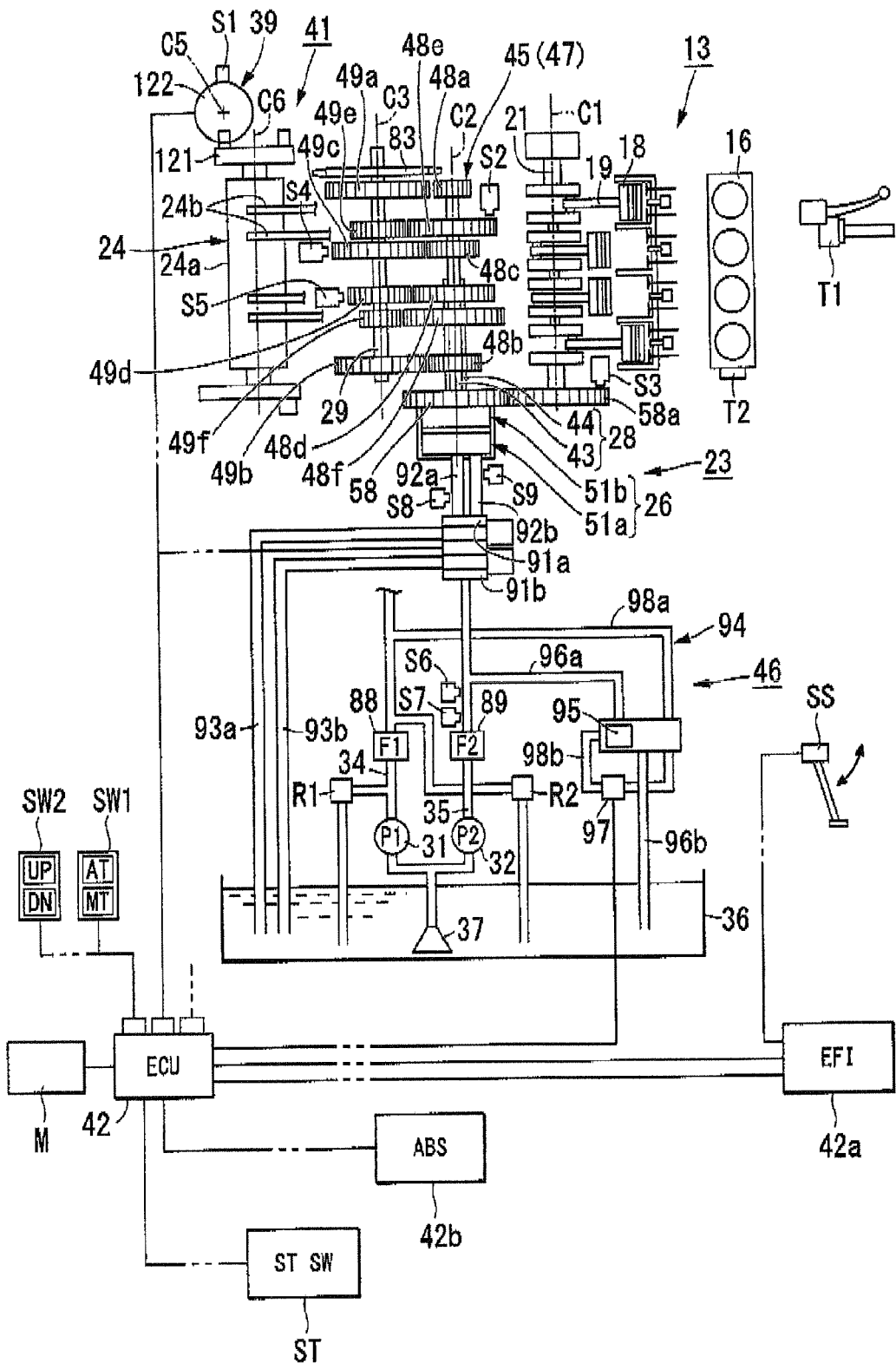
FIG. 5 is a configuration diagram of the twin clutch transmission.

Here, as shown in FIG. 5, the motorcycle 1 is provided with an automatic transmission system primarily including: the twin clutch transmission 23 provided so as to be connected to the engine 13; a gear shift device 41 in which a driving mechanism 39 is provided in the change mechanism 24; and an electronic control unit (ECU) 42 that controls operations of the twin clutch transmission 23 and the gear shift device 41.

Figure 4:
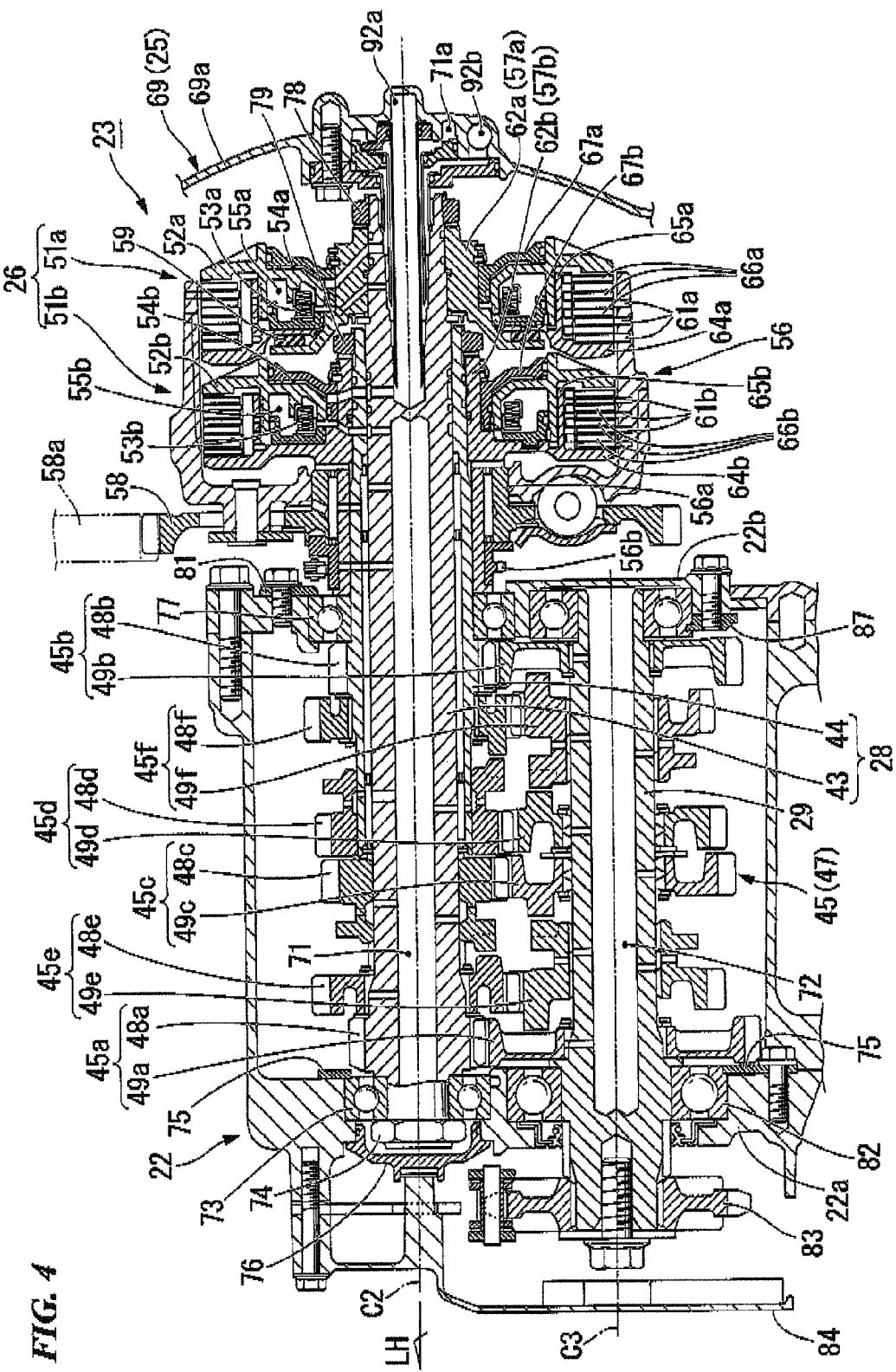
FIG. 4 is a sectional view of a twin clutch transmission of the engine.

Also making reference to FIG. 4, the twin clutch transmission 23 is provided with the main shaft 28 of a dual structure having inner and outer shafts 43 and 44; the counter shaft 29 arranged parallel with this main shaft 28; a speed change gear set 45 arranged between the main shaft 28 and the counter shaft 29; the twin clutch 26 coaxially arranged on the right end section of the main shaft 28; and a hydraulic pressure supply device 46 that supplies hydraulic operating pressure to this twin clutch 26. Hereunder, a collective body including the main shaft 28, the counter shaft 29, and the speed change gear set 45 may be referred to as a transmission 47.

The main shaft 28 has a configuration where the right side section of the inner shaft 43 extending in the left-right direction of the mission case 22 is inserted through inside the outer shaft 44. On the outer circumferences of the inner and outer shafts 43 and 44 there are distributedly-arranged driving gears 48a to 48f for six speeds in the speed change gear set 45. On the other hand, on the outer circumference of the counter shaft 29 there are arranged driven gears 49a to 49f for six speeds in the speed change gear set 45. The respective driving gears 48a to 48f and the driven gears 49a to 49f mesh with each other at each of the speed stages, respectively forming speed change gear pairs 45a to 45f that correspond to the respective speed stages. Each of the speed change gear pairs 45a to 45f is such that the reduction gear ratio becomes smaller (becomes a higher speed gear) in order from the first speed to the sixth speed.

The twin clutch 26 includes hydraulic pressure type first and second disk clutches (hereunder, may be referred to simply as clutches) 51a and 51b arranged coaxially adjacent to each other, and the inner and outer shafts 43 and 44 are respectively coaxially connected to these clutches 51a and 51b. It is possible to individually engage and disengage the respective clutches 51a and 51b with the presence/absence of hydraulic pressure supply from the hydraulic pressure supply device 46.

The change mechanism 24 moves a plurality of shift forks 24b with rotation of a shift drum 24a arranged parallel to the respective shafts 28 and 29, to thereby switch the speed change gear pairs to be used for power transmission to the counter shaft 29. On the left end section of the shift drum 24a there is arranged the driving mechanism 39. Reference symbol S1 in FIG. 5 denotes a sensor (a pair of switch cams 131 and a first switch 133 or second switch 134 for detecting rotational angle of a barrel cam 122 to be described later) that detects an amount of operation of the driving mechanism 39 for detecting the speed stage of the transmission 47.

The electronic control unit (ECU) 42, based in addition to information from the above respective sensors, on information from a throttle grip opening sensor T1, a throttle valve opening sensor T2 of a throttle body 16, a side-stand (or center-stand) housing sensor SS, and for example, a mode switch SW1 and a shift switch SW2 provided on a handlebar, controls operations of the twin clutch transmission 23 and the gear shift device 41 to thereby change the speed stage (shift position) of the transmission 47.

A speed change mode to be selected by the mode switch SW1 includes a full automatic mode in which speed stages are automatically switched based on vehicle raveling information such as vehicle speed and engine revolution, and a semi-automatic mode in which speed stages are switched only by operations of the shift switch SW2 based on the rider's intention. The current speed change mode and speed stage are appropriately displayed on a meter device M provided in the vicinity of the handlebar for example. The ECU 42 appropriately shares information from the respective sensors with an ECU 42a for a fuel injection device and an ECU 42b for an anti-locking brake device.

Moreover one of the respective clutches 51a and 51b is engaged and the other one is disengaged, and power transmission is carried out with use of any one of the speed change gear pairs connected to one of the inner and outer shafts 43 and 44, while a speed change gear pair to be used next is pre-selected from among the speed change gear pairs to be connected to the other one of the inner and outer shafts 43 and 44. From this state, one of the respective clutches 51a and 51b is disengaged and the other one is engaged, to thereby switch to power transmission with use of the pre-selected speed change gear pair, and thus the transmission 47 is shifted up or shifted down. Reference symbol S2 in FIG. 5 denotes a vehicle speed sensor that detects rotation speed of the main shaft 28 (that detects rotation speed of the driving gear 48e that meshes with the driven gear 49e that integrally rotates with the counter shaft 29) for vehicle speed detection, reference symbol S3 denotes a rotation speed sensor that detects rotation speed of a primary drive 58a for engine revolution speed (crank shaft rotation speed) detection, and reference symbols S4 and S5 respectively denote rotation speed sensors that detect rotation speed of the inner and outer shafts 43 and 44 (that detect rotation speed of the driven gears 49c and 49d that mesh with the integrally rotating respective driving gears 48c and 48d of the inner and outer shafts 43 and 44).

Figure 6:
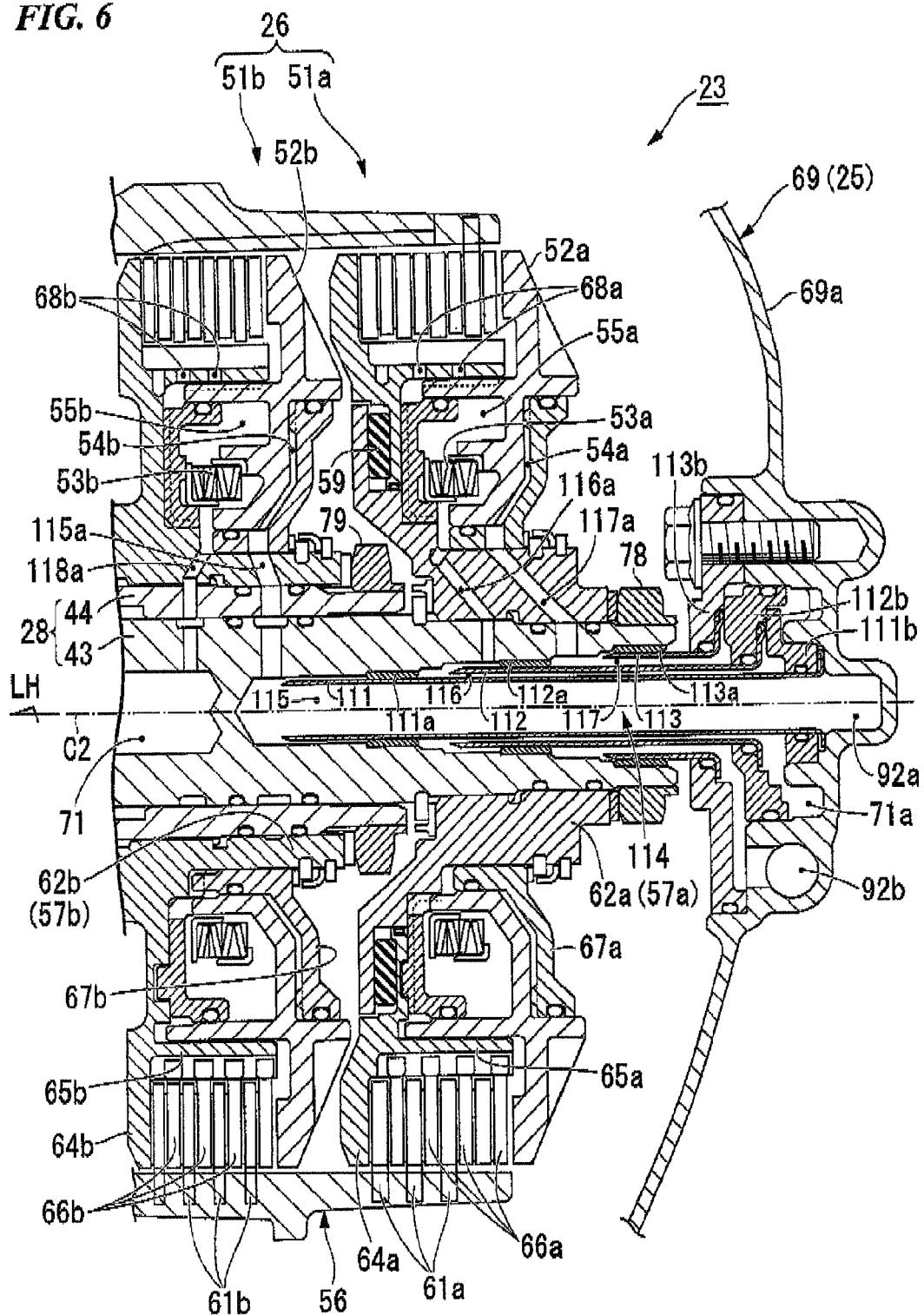
FIG. 6 is a sectional view of a twin clutch of the twin clutch transmission.

As shown in FIG. 6, the twin clutch 26 is such that inside the clutch case 25 (inside the hydraulic chamber), the first clutch 51a for odd gears is arranged on the right side (outer side in the vehicle width direction) and the second clutch 51b is arranged on the left side (inner side in the vehicle width direction). The respective clutches 51a and 51b are wet type multiplate clutches having a plurality of clutch plates alternately superposed in the axial direction thereof. The right side section of the clutch case 25 is a clutch cover 69 that is attachably and detachably fixed with a plurality of bolts (refer to FIG. 3 and FIG. 4), and the first clutch 51a is arranged toward a right outer wall 69a side of this clutch cover 69.

The respective clutches 51a and 51b are hydraulic pressure type clutches that displace pressure plates 52a and 52b in the axial direction with externally supplied hydraulic pressure to thereby exert a predetermined engagement force, and are provided with: return springs 53a and 53b that bias the pressure plates 52a and 52b to the clutch disengagement side; engagement side hydraulic chambers 54a and 54b, that give the pressure plates 52a and 52b a pressing force towards the clutch engagement side; and disengagement side hydraulic chambers 55a and 55b that give the pressure plates 52a and 52b a pressing force towards the clutch disengagement side and compensate a pressure for the returning action thereof (that cancel an amount of the pressing force increased by the centrifugal force of the respective clutches 51a and 51b). In the disengagement side hydraulic chambers 55a and 55b, hydraulic pressure from the first oil pump 31 constantly operates in a comparatively low pressure state. On the other hand, a comparatively high hydraulic pressure from the hydraulic pressure supply device 46 can be supplied into the engagement side hydraulic chambers 54a and 54b.

Also making reference to FIG. 4, the respective clutches 51a and 51b are configured so as to share a single clutch outer 56 and have substantially the same diameter. The clutch outer 56 is of a bottom-ended cylinder shape that opens to the right, and on the left side of the interior thereof there is arranged a clutch center 57a for the first clutch 51a, and on the right side of the interior thereof there is arranged a clutch center 57b for the second clutch 51b.

On the bottom section left side of the clutch outer 56 there is connected via a spring damper a primary driven gear 58, and the primary drive gear 58a of the crank shaft 21 meshes with this primary driven gear 58. The clutch outer 56 is such that a hub section 56a thereof is relatively and rotatably supported via a needle bearing on the main shaft 28 (outer shaft 44), and it integrally rotates together with rotation of the crank shaft 21. On the left side of the primary driven gear 58 in the hub section 56a of the clutch outer 56, there is integrally and rotatably provided a driving sprocket 56b for driving the respective oil pumps 31 and 32. On the inner circumferential right side and on the inner circumferential left side of the outer wall section of the clutch outer 56, there are supported respectively a plurality of clutch plates 61a for the first clutch 51*a* and a plurality of clutch plates 61*b* for the second clutch 51*b* so as to be unable to relatively rotate.

The clutch center 57*a* of the first clutch 51*a* is such that a center cylinder section 62*a* thereof is spline-fitted to the right end section of the inner shaft 43 that projects to the right from the right end section of the outer shaft 44, and is integrally fixed by a lock nut 78. The left side section of the clutch center 57*a* is a flange section 64*a* that expands towards the inner circumference of the outer wall section of the clutch outer 56. On the radial direction intermediate section of the flange section 64*a* there is provided an inner wall section 65*a* projecting to the right, and on the outer circumference of this inner wall section 65*a* there is supported a plurality of clutch disks 66*a* so as to be unable to relatively rotate. The respective clutch disks 66*a* and the respective clutch plates 61*a* are arranged so as to be alternately superposed in the clutch shaft direction.

On the right side of the flange section 64*a* there is opposingly arranged the pressure plate 52*a* with a predetermined gap therebetween, and between the outer circumference side of this pressure plate 52*a* and the outer circumference side of the flange section 64*a* there are arranged in a laminated state the respective clutch plates 61*a* and the respective clutch disks 66*a*. Between the inner circumference side of the pressure plate 52*a* and the inner circumference side of the flange section 64*a*, there is formed the disengagement side hydraulic chamber 55*a*, and there is arranged the return spring 53*a* that biases the pressure plate 52*a* to the right (to the side distanced from the flange section 64*a*, to the clutch disengagement side).

On the right side of the inner circumference side of the pressure plate 52*a*, there is opposingly arranged a support flange section 67*a* integrally provided on the outer circumference of the center cylinder section 62*a*, and between this support flange section 67*a* and the inner circumference side of the pressure plate 52*a* there is formed the engagement side hydraulic chamber 54*a*.

Here, the flange section 64*a* is configured with the inner and outer circumference sides separate from each other, and between these inner and outer separated bodies there is interveningly provided a damper member 59 made from an elastic body such as rubber. As a result, shock absorbing performance at the time of clutch disengagement of the first clutch 51*a* is increased.

On the other hand, the clutch center 57*b* of the second clutch 51*b* is such that a center cylinder section 62*b* thereof is spline-fitted to the right end section of the outer shaft 44 and is integrally fixed by a lock nut 79. The left side section of the clutch center 57*b* is a flange section 64*b* that expands towards the inner circumference of the outer wall section of the clutch outer 56. On the radial direction intermediate section of the flange section 64*b* there is provided an inner wall section 65*b* projecting to the right and on the outer circumference of this inner wall section 65*b* there is supported a plurality of clutch disks 66*b* so as to be unable to relatively rotate. The respective clutch disks 66*b* and the respective clutch plates 61*b* are arranged so as to be alternately superposed in the clutch shaft direction.

On the right side of the flange section 64*b* there is opposingly arranged the pressure plate 52*b* with a predetermined gap therebetween, and between the outer circumference side of this pressure plate 52*b* and the outer circumference side of the flange section 64*a* there are arranged in a laminated state the respective clutch plates 61*b* and the respective clutch disks 66*b*. Between the inner circumference side of the pressure plate 52*b* and the inner circumference side of the flange section 64*b*, there is formed the disengagement side hydraulic chamber 55*b*, and there is arranged the return spring 53*b* that biases the pressure plate 52*b* to the right (to the side distanced from the flange section 64*b*, to the clutch disengagement side).

On the right side of the inner circumference side of the pressure plate 52*b*, there is opposingly arranged a support flange section 67*b* integrally provided on the outer circumference of the center cylinder section 62*b*, and between this support flange section 67*b* and the inner circumference side of the pressure plate 52*b* there is formed the engagement side hydraulic chamber 54*b*.

The flange section 64*b* is configured such that the inner and outer circumference sides thereof are integrated with each other. However, as with the flange 64*a*, it may be separately configured with a damper member interveningly provided therein. Here, the respective clutches 51*a* and 51*b* are such that the thicknesses of the respective clutch plates 61*a* and 61*b* are made different to each other (the clutch plate 61*a* of the first clutch 51*a* is made thicker than the clutch plate 61*b* of the second clutch 51*b*), to thereby have different thermal capacities while having the same number of disks and the same diameter.

In an engine stop state (stop state of the respective oil pumps 31 and 32), the respective clutches 51*a* and 51*b*, with the biasing forces of the respective return springs 53*a* and 53*b*, displace the pressure plates 52*a* and 52*b* to the right, thereby giving a clutch disengagement state where friction engagement between the respective clutch plates 61*a* and 61*b* and the respective clutch disks 66*a* and 66*b* has been disengaged. Moreover, even when the engine is being operated, in a state where supply of hydraulic pressure from the hydraulic pressure supply device 46 is stopped, biasing forces of the return springs 53*a* and 53*b* and hydraulic pressure of the respective disengagement side hydraulic chambers 55*a* and 55*b* act on the pressure plates 52*a* and 52*b*, thereby giving a clutch disengagement state similar to that mentioned above.

On the other hand, in the first clutch 51*a*, in a state where the engine is being operated and a comparatively high hydraulic pressure from the hydraulic pressure supply device 46 is being supplied into the engagement side hydraulic chamber 54*a*, the pressure plate 52*a* is displaced to the left (to the flange section 64*a* side, the clutch engagement side) against the hydraulic pressure of the disengagement side hydraulic chamber 55*a* and the biasing force of the return spring 53*a*, so as to clamp the respective clutch plates 61*a* and the respective clutch disks 66*a*, causing them to friction-engage with each other. As a result, this gives a clutch engagement state where torque transmission between the clutch outer 56 and the clutch center 57*a* is possible.

Similarly, in the second clutch 51*b*, in a state where the engine is being operated and a comparatively high hydraulic pressure from the hydraulic pressure supply device 46 is being supplied into the engagement side hydraulic chamber 54*b*, the pressure plate 52*b* is displaced to the left (to the flange section 64*b* side, the clutch engagement side) against the hydraulic pressure of the disengagement side hydraulic chamber 55*b* and the biasing force of the return spring 53*b*, so as to clamp the respective clutch plates 61*b* and the respective clutch disks 66*b*, causing them to friction-engage with each other. As a result, this gives a clutch engagement state where torque transmission between the clutch outer 56 and the clutch center 57*b* is possible.

When from the clutch engagement state of the respective clutches 51*a* and 51*b*, hydraulic pressure supply to the engagement side hydraulic chambers 54*a* and 54*b* is stopped, the hydraulic pressure of the disengagement side hydraulic chambers 55*a* and 55*b* and the biasing forces of the return springs 53a and 53b cause the pressure plates 52a and 52b to displace to the left, thereby giving the above mentioned clutch disengagement state where friction engagement between the respective clutch plates 61a and 61b and the respective clutch disks 66a and 66b has been disengaged, and torque transmission is thereby made impossible between the clutch outer 56 and the clutch centers 57a and 57b. As described above, with use of the hydraulic pressure of the disengagement side hydraulic chambers 55a and 55b in addition to the biasing forces of the return springs 53a and 53b, it is possible, even if hydraulic pressure remains within the engagement side hydraulic chambers 54a and 54b due to centrifugal force, to reliably move the pressure plates 52a and 52b.

Here, the engine oil supplied into the disengagement side hydraulic chambers 55a and 55b of the respective clutches 51a and 51b is guided to the outside of the hydraulic chambers through oil passages 68a and 68b formed in the inner wall sections 65a and 65b, and is supplied to the respective clutch plates 61a and 61b and the respective clutch disks 66a and 66b on the outer circumference of the inner wall sections 65a and 65b. Thus, by releasing the operating oil within the disengagement side hydraulic chambers 55a and 55b, it is possible to maintain the inside of the disengagement side hydraulic chambers 55a and 55b at a predetermined low pressure while enhancing the lubricating and cooling performance of the respective clutch plates 61a and 61b and the respective clutch disks 66a and 66b in the disengagement state.

The above mentioned oil passages 68a and 68b may be formed as an oil passage 168 as shown for example in FIG. 7A, substantially perpendicular to the clutch shaft direction, in the flange section 64a of the clutch center 57a, or they may be formed as an oil passage 268 as shown in FIG. 7B, substantially parallel to the clutch shaft direction, in the flange section 64a of the clutch center 57a. FIG. 7A and FIG. 7B show the first clutch 57a; however, a similar modified example may be applied to the second clutch 51b.

As shown in FIG. 4, the transmission 47 is a constant mesh type transmission in which the driving gears 48a to 48f that correspond to the respective speed stages are constantly meshed with the driven gears 49a to 49f. The respective gears are broadly classified as free gears that can freely rotate relative to the shaft, and sliding gears that are spline-fitted to the shaft. By appropriately sliding an arbitrary sliding gear with the change mechanism 24, they enable power transmission with use of a speed change gear pair that corresponds to any one of the speed stages.

In the interior of the main shaft 28 (inner shaft 43) and the counter shaft 29, there are respectively formed primary oil feed passages 71 and 72, through which hydraulic pressure from the first oil pump 31 can be supplied, and engine oil is appropriately supplied through these primary oil feed passages 71 and 72 to the speed change gear set 45.

The inner shaft 43 the main shaft 28 is a comparatively thick-walled hollow cylinder shape, and this inner shaft 43 is relatively rotatably inserted, via a needle bearing, into the comparatively thick-walled cylinder-shaped outer shaft 44.

The left end section of the inner shaft 43 reaches a left outer wall 22a of the mission case 22 and is rotatably supported on this left outer wall 22a via a ball bearing 73. The left end section of the inner shaft 43 projects to the left of the ball bearing 73. On this projected section there is threaded a lock nut 74. This lock nut 74 and the step section of the inner shaft 43 tighten and fix the inner race of the ball bearing 73.

Making reference also to FIG. 8, on the left outer wall 22a of the mission case 22 there is fixed with a bolt from the inside of the case, a holder plate 75, and this holder plate 75 and the step section of the left outer wall 22a of the mission case 22 tighten and fix the outer race of the bail bearing 73. As a result, the axial direction positioning of the inner shaft 43 is determined via the ball bearing 73. The left end section of the inner shaft 43 passes through the left outer wall 22a of the mission case 22. However, the through hole in this left outer wall 22a (supporting hole of the ball bearing 73) for the inner shaft 43 is oil-tightly closed from the outside of the mission case 22 by a sealing cap 76.

The right end section of the inner shaft 43 passes through a right side wall 22b of the mission case 22 (which is also the left side wall of the clutch case 25) and reaches the vicinity of the right outer wall 69a of the clutch case 25 (clutch cover 69), and to this right end section there is attached the clutch center 57a of the first clutch 51a so as to be unable to relatively rotate. The left-right-intermediate section of the inner shaft 43 is rotatably supported, via the outer shaft 44 and a ball bearing 77, on the right side wall 22b of the mission case 22. On the right end section of the inner shaft 43 there is threaded the lock nut 78. This lock nut 78 and the thrust receiving section of the inner shaft 43 tighten and fix the center cylinder section 62a of the clutch center 57a.

The outer shaft 44 is shorter than the inner shaft 43, and the left end section thereof terminates at the left-right-intermediate section of the mission case 22. In a part on the outer shaft 44 positioned to the left from the ball bearing 77, there are supported the driving gears 48b, 48d, and 48f corresponding to the even stages (second speed, fourth speed, and sixth speed) in the speed change gear set 45, in order from the left side for; the fourth speed, the sixth speed, and the second speed. On the other hand, in a part on the inner shaft 43 positioned to the left from the left end section of the outer shaft 44, there are supported the driving gears 48a, 48c, and 48e corresponding to the odd stages (first speed, third speed, and fifth speed) in the speed change gear set 45, in order from the left side for; the first side, the fifth speed, and the third speed.

The right end section of the outer shaft 44 passes through the right side wall 22b of the mission case 22 and reaches the inside of the clutch case 25, and to this right end section there is attached the clutch center 57b of the second clutch 51b so as to be unable to relatively rotate. In a part on the outer shaft 44 between the clutch center 57b and the ball bearing 77, there is relatively and rotatably supported the clutch outer 56 (and the primary driven gear 58).

On the right end section of the outer shaft 44 there is threaded the lock nut 79. This lock nut 79 and the thrust receiving section of the outer shaft 44 tighten and fix the inner race of the ball bearing 77, the distance collar on the inner side of the hub section 56a of the clutch outer 56, and the center cylinder section 62b of the clutch center 57b.

On the right side wall 22b of the mission case 22 there is fixed with a bolt from the case outer side (clutch case 25 side), a holder plate 81, and this holder plate 81 and the step section of the right side wall 22b of the mission case 22 tighten and fix the outer race of the ball bearing 77. As a result, axial direction positioning with respect to the mission case 22 in the outer shaft 44 is determined via the ball bearing 77.

The left side section of the counter shaft 29 is rotatably supported, via a ball bearing 82, on the left outer wall 22a of the mission case 22. The left end section of the counter shaft 29 projects to the left of the ball bearing 82, and on this left end section there is spline-fitted and fixed with a bolt, a driving sprocket 83 in the mechanism for transmitting power to the rear wheel 11. The periphery of the driving sprocket 83 and the sealing cap 76 is covered by a sprocket cover 84 to be attached to the left side of the mission case 22. The outer race of the ball bearing 82 is tightened and fixed by the holder plate 75 and the step section of the left outer wall 22a of the mission case 22 (refer to FIG. 8).

The right side section of the counter shaft 29 is rotatably supported, via a ball bearing 86, on the right side wall 22b of the mission case 22. On the right side wall 22b of the mission case 22 there is fixed with a bolt, a holder plate 87, and this holder plate 87 and the step section of the right side wall 22b of the mission case 22 tighten and fix the outer race of the ball bearing 86. In a part on the counter shaft 29 positioned between the respective ball bearings 82 and 86, there are supported, in order as with that of the respective driving gears 48a to 48f, the driven gears 49a to 49f corresponding to the respective speed change stages in the speed change gear set 45.

Here, the transmission 47 is configured as a cartridge type that can be taken out integrally with the right side wall 22b of the mission case 22, to the outside of the mission case 22.

The right side wall 22b of the mission case 22 is configured so as to be attachable/detachable with a plurality of bolts to a case main body, and functions as a mission holder in which this right side wall 22b retains the transmission 47 as a single unit.

Roughly describing the manner of taking out this transmission 47 to the outside of the mission case 22, first, on the case left side, the sprocket cover 84 and the sealing cap 76 are detached, and the lock nut 74 is detached from the left end section of the main shaft 28, while detaching the driving sprocket 83 from the left end section of the counter shaft 29. Subsequently, having detached the clutch cover 69 on the case right side and detached the lock nut 78 and the clutch center 57a from the inner shaft 43, the lock nut 79, the clutch center 57b, the clutch outer 56 and so forth are detached from the outer shaft 44, and then the transmission 47 as well as the mission holder are drawn out to the right of the mission case 22. At this time, the ball bearing 73 that supports the left end section of the main shaft 28 and the ball bearing 82 that supports the left end section of the counter shaft 29 remain retained on the left outer wall 22a of the mission case 22 by the holder plate 75.

As shown in FIG. 5, the hydraulic pressure supply device 46 primarily includes: the respective oil pumps 31 and 32; the primary oil feed passage 34 that extends from the discharge port of the first oil pump 31; a first oil filter 88 arranged in this primary oil feed passage 34; the oil feed passage 35 that extends from the discharge port of the second oil pump 32; a second oil filter 89 arranged in this oil feed passage 35; first and second solenoid valves (proportional type linear solenoid valves) 91a and 91b to which the downstream side of the oil feed passage 35 is connected; first and second oil feed passages 92a and 92b that extend from these solenoid valves 91a and 91b to the engagement side hydraulic chambers 54a and 54b of the respective clutches 51a and 51b; and an hydraulic pressure cut-off device 94 that returns the hydraulic pressure from the second oil pump 32 to the oil pan 36 when starting the engine.

Reference symbols 56 and 57 denote a hydraulic pressure sensor and an oil temperature sensor provided in the primary oil feed passage 34 to detect hydraulic pressure and oil temperature, reference symbols R1 and R2 denote relief valves provided on oil passages branched from the primary oil feed passage 34 and the oil feed passage 35 to operate when a predetermined hydraulic pressure is exceeded, and reference symbols S8 and S9 denote hydraulic pressure sensors provided on the respective oil feed passages 92a and 92b to detect supplied hydraulic pressure to the respective clutches 51a and 51b.

The oil feed passage 35 is able to individually communicate with either one of the respective oil feed passages 92a and 92b with operation of the respective solenoid valves 91a and 91b, and when the oil feed passage 35 communicates with either one of the respective oil feed passages 92a and 92b, a comparatively high hydraulic pressure from the second oil pump 32 is supplied, via either one of the respective oil feed passages 92a and 92b, to either one of the engagement side hydraulic chambers 54a and 54b of the respective clutches 51a and 51b.

Specifically, when electric power is applied to the first solenoid valve 91a, communication of the oil feed passage 35 with the first oil feed passage 92a is cut-off, and the hydraulic pressure from the second oil pump 32 and the hydraulic pressure within the engagement side hydraulic chamber 54a are returned to the oil pan 36 via a return oil passage 93a. On the other hand, when electric power is applied to the first solenoid valve 91a, the oil feed passage 35 communicates with the first oil feed passage 92a, and it becomes possible to supply hydraulic pressure from the second oil pump 32 to the engagement side hydraulic chamber 54a via the first oil feed passage 92a.

Similarly, when electric power is applied to the second solenoid valve 91b, communication of the oil feed passage 35 with the second oil feed passage 92b is cut-off, and the hydraulic pressure from the second oil pump 32 and the hydraulic pressure within the engagement side hydraulic chamber 54b are returned to the oil pan 36 via a return oil passage 93b. Moreover, when electric power is applied to the second solenoid valve 91b, the oil feed passage 35 communicates with the second oil feed passage 92b, and it becomes possible to supply hydraulic pressure from the second oil pump 32 to the engagement side hydraulic chamber 54b via the second oil feed passage 92b.

A hydraulic pressure relief oil passage 96a branches off from the downstream side of the second oil filter 89 in the oil feed passage 35, and this hydraulic pressure relief oil passage 96a connects via a valve 95 to a hydraulic pressure relief oil passage 96b. Moreover, a hydraulic pressure switching oil passage 98a branches off from the downstream side of the first oil filter 88 in the primary oil feed passage 34, and this hydraulic pressure switching oil passage 98a connects via a hydraulic pressure switching valve 97 to a hydraulic pressure switching oil passage 98b. The hydraulic pressure switching oil passage 98b connects to the hydraulic pressure relief valve 95, and the hydraulic pressure relief valve 95 is operated by opening and closing of the hydraulic pressure switching valve 97, with use of the hydraulic pressure from the primary oil feed passage 34. These oil passages and valves are primary components that form the hydraulic pressure cut-off device 94.

With operation of the hydraulic pressure relief valve 95, the hydraulic pressure relief oil passages 96a and 96b establish or cut-off communication with each other, and when the hydraulic pressure relief oil passages 96a and 96b communicate with each other, the hydraulic pressure from the second oil pump 32 is returned via the hydraulic pressure relief oil passages 96a and 96b to the oil pan 36, and thereby supply of the hydraulic pressure from the respective solenoid valves 91a and 91b to the respective clutches 51a and 51b ceases. As a result, the respective clutches 51a and 51b are maintained in the disengagement state while reducing load on the second oil pump 32.

On the other hand, when communication between the hydraulic pressure relief oil passages 96a and 96b is cut-of the hydraulic pressure from the second oil pump 32 is not returned to the oil pan 36, and hydraulic pressure is supplied to the respective solenoid valves 91a and 91b. With operation of the respective solenoid valves 91a and 91b in this state, hydraulic pressure is supplied to the respective clutches 51a and 51b, causing them to switch to the clutch engagement state.

In the above twin clutch transmission 23, when the engine of the motorcycle 1 has started and the motorcycle 1 is not travelling, both of the respective clutches 51a and 51b are maintained in the disengagement state with actions of the hydraulic pressure cut-off device 94. At this time, for example if the side stand is stored (in the full automatic mode), the shift switch is operated (in the semi-automatic mode), or the lice, the transmission 47 is brought from a neutral state where power transmission is cut-off, for the motorcycle 1 to prepare for traveling start, into a first speed state where power transmission via the first speed gear (traveling start gear, speed change gear pair 45a) is possible, and for example as the engine revolution speed increases from this state, the first clutch 51a is brought into an engagement state via a half-engaged clutch state to start the motorcycle 1 traveling.

Moreover, when the motorcycle 1 is traveling, the twin clutch transmission 23 brings only one of the respective clutches 51a and 51b that corresponds to the current shift position into the engagement state while the other one remains in the disengagement state to carry out power transmission via either one of the inner and outer shafts 43 and 44 and any one of the respective speed change gear pairs 45a to 45f (or both of the clutches are brought into the engagement state and the transmission is brought into the neutral state to standby). At this time, the ECU 42 operation-controls the twin clutch transmission 23 based on vehicle traveling information, and preliminarily creates a state where power transmission through a speed change gear pair that corresponds to the next shift position is possible.

Specifically, if the current shift position is on an odd speed stage (or even speed stage), then the next shift position will be on an even speed stage (or odd speed stage), and engine output is therefore transmitted via the first clutch 51a (or the second clutch 51b) to the inner shaft 43 (or the outer shaft 44). At this time, the second clutch 51b (or the first clutch 51a) is in the disengagement state, and engine output is not transmitted to the outer shaft 44 (or the inner shaft 43) (or both of the clutches are in the engagement state, but the transmission is in the neutral state and engine output is not transmitted).

After this, when the ECU 42 has judged that the shift-timing has been reached, by only bringing the first clutch 51a (or the second clutch 51b) into the disengagement state and the second clutch 51b (or the first clutch 51a) into the engagement state, the transmission is switched to power transmission that uses a speed change gear pair corresponding to the preliminarily selected next shift position. Thereby, it becomes possible to quickly and smoothly change speed without a time lag in speed-changing or a discontinuity in power transmission (or in the case of standing-by in the neutral state, the shift position is shifted to the next shift position, and then the corresponding clutch is engaged).

As shown in FIG. 2 and FIG. 3, on the under section right side of the crank case 14 and below the clutch cover 69, there is attached a body 101 of the hydraulic pressure cut-off device 94 of the hydraulic pressure supply device 46. In this body 101, as shown in FIG. 9, there are respectively formed substantially in the front-rear direction, a valve housing section 102 for the hydraulic pressure relief valve 95 and a valve housing section 103 for the hydraulic pressure switching valve 97, and there are respectively formed the main sections of the hydraulic pressure relief oil passages 96a and 96b, and the hydraulic pressure switching oil passages 98a and 98b.

Here, the hydraulic pressure cut-off device 94 is arranged on the under section right side of the crank case 14 and below the clutch covet 69, and therefore the hydraulic pressure cut-off device 94 becomes discreet and the appearance of the engine 13 is thereby excellently maintained, while enabling suppression of lateral projection of the hydraulic pressure cut-off device 94. As a result the cover structure is simplified and the banking angle for the motorcycle 1 is ensured. The line GL in FIG. 3 denotes the ground surface for when the vehicle body has banked to just before the exhaust pipe 17 extending under the engine 13 in the front-rear direction comes in contact with the ground surface. Since the body 101 of the hydraulic pressure cut-off device 94 is away from the ground surface, protection of the hydraulic pressure cut-off device 94 is enhanced.

Figure 9:
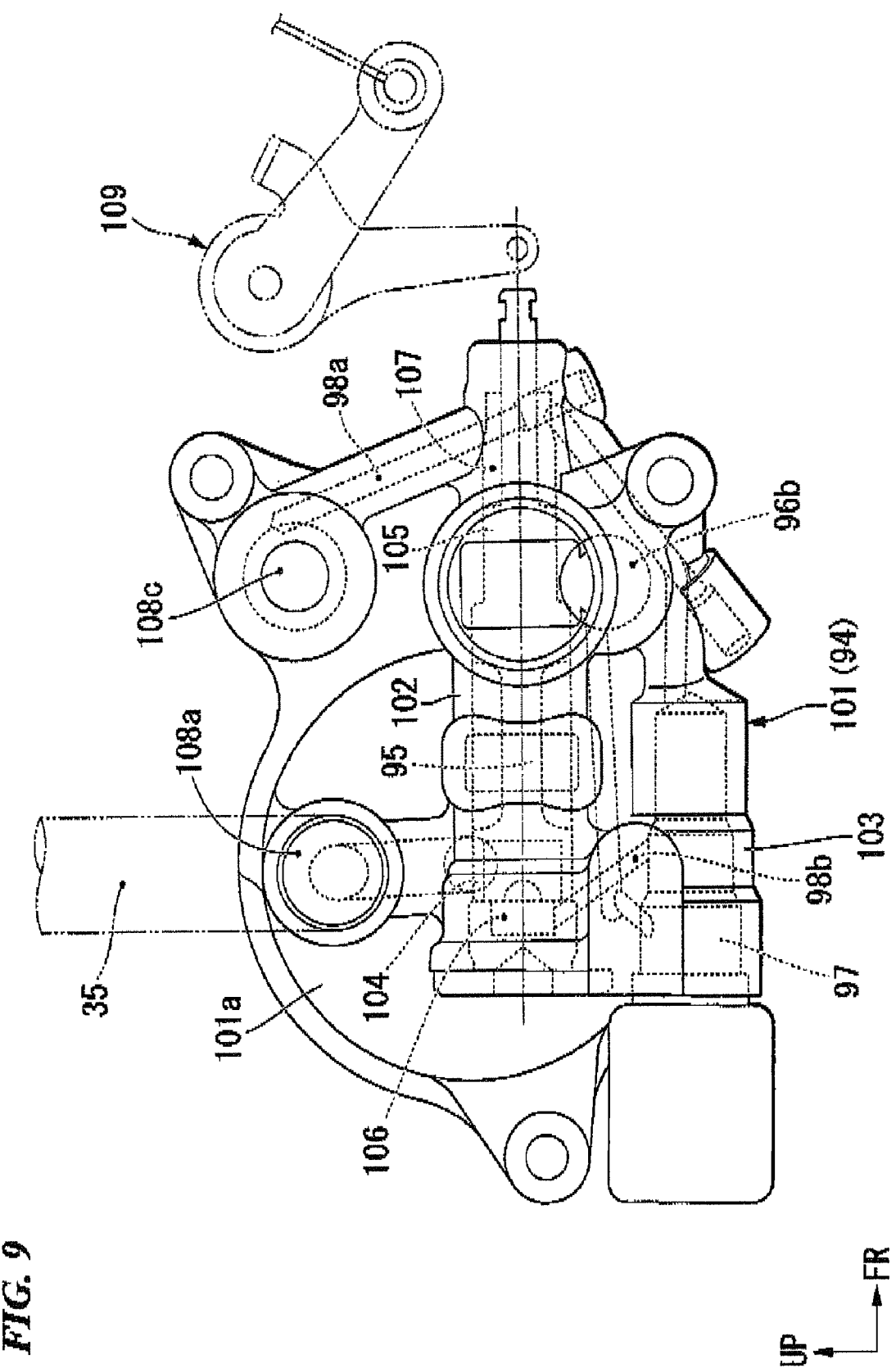
FIG. 9 is a right side view of a hydraulic pressure cut-off device of the twin clutch of the twin clutch transmission.

As shown in FIG. 9, the hydraulic pressure relief valve 95 has, in front of a rod shaped main body, first and second pistons 104 and 105, and is fitted within a valve housing section 102 while allowing itself to reciprocate forward and backward. In the valve housing section 102, on the front side of the first piston 104 and on the rear side of the second piston 105, there are respectively formed a relief side hydraulic chamber 106 and a returning side hydraulic chamber 107.

Also making reference to FIG. 3, on the vehicle width direction inner side of the rear section of the body 101 in the hydraulic pressure cut-off device 94, there is arranged the second oil filter 89 having a cylindrical shape along the left-right direction. In the rear section of the body 101 of the hydraulic pressure cut-off device 94, there is integrally formed a cover 101a that covers, from the vehicle width direction outer side, a housing section for the second oil filter, in the crank case 14.

The engine oil discharged from the second oil pump 32 travels through the second oil filter 89 from the outer circumferential side thereof to the center section thereof to be filtered, and is then pressure-fed through a communicating section 108a on the upper side of the cover 101a to the upstream side of the oil feed passage 35. The oil feed passage 35 extends upward from the communicating section 108a and reaches the respective solenoid valves 91a and 91b arranged on the clutch case 25 (refer to FIG. 2 and FIG. 3).

Here, the respective solenoid valves 91a and 91b are arranged on the same side as the twin clutch 26 and the hydraulic pressure cut-off device 94, that is, on the right side of the engine, and thereby the hydraulic pressure supply passages thereto can be simplified.

Figure 18:
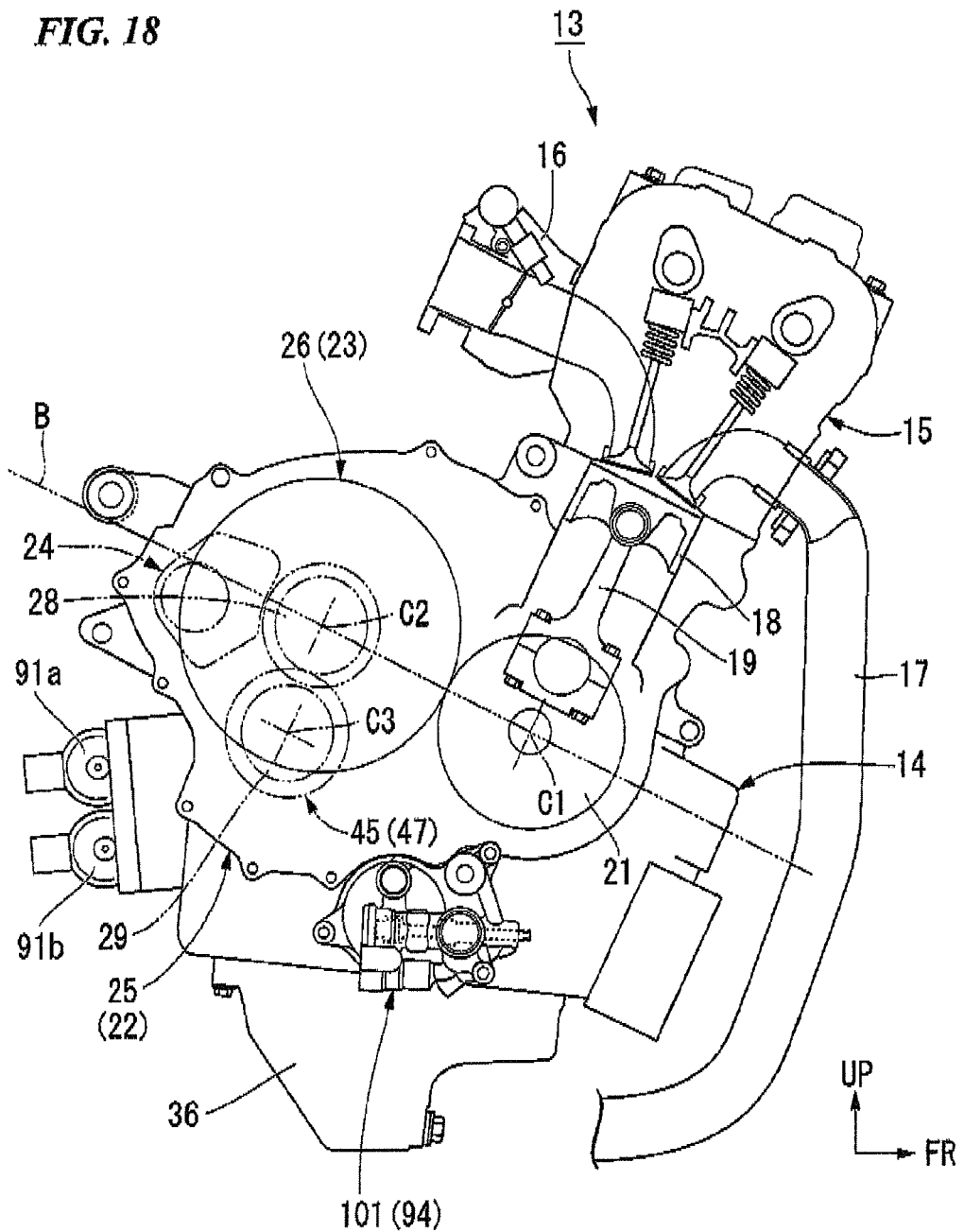
FIG. 18 is a drawing showing a modified example of a solenoid valve arrangement in the twin clutch transmission, being a side view corresponding to FIG. 10.

As shown in FIG. 18, the respective solenoid valves 91a and 91b may be arranged on the same side as the twin clutch 26 and the hydraulic pressure cut-off device 94, that is, on the right side of the engine and on the rear side of the clutch case 25, and in this case it is also possible, as with the above mentioned case, to simplify the hydraulic pressure supply passages.

Figure 19:
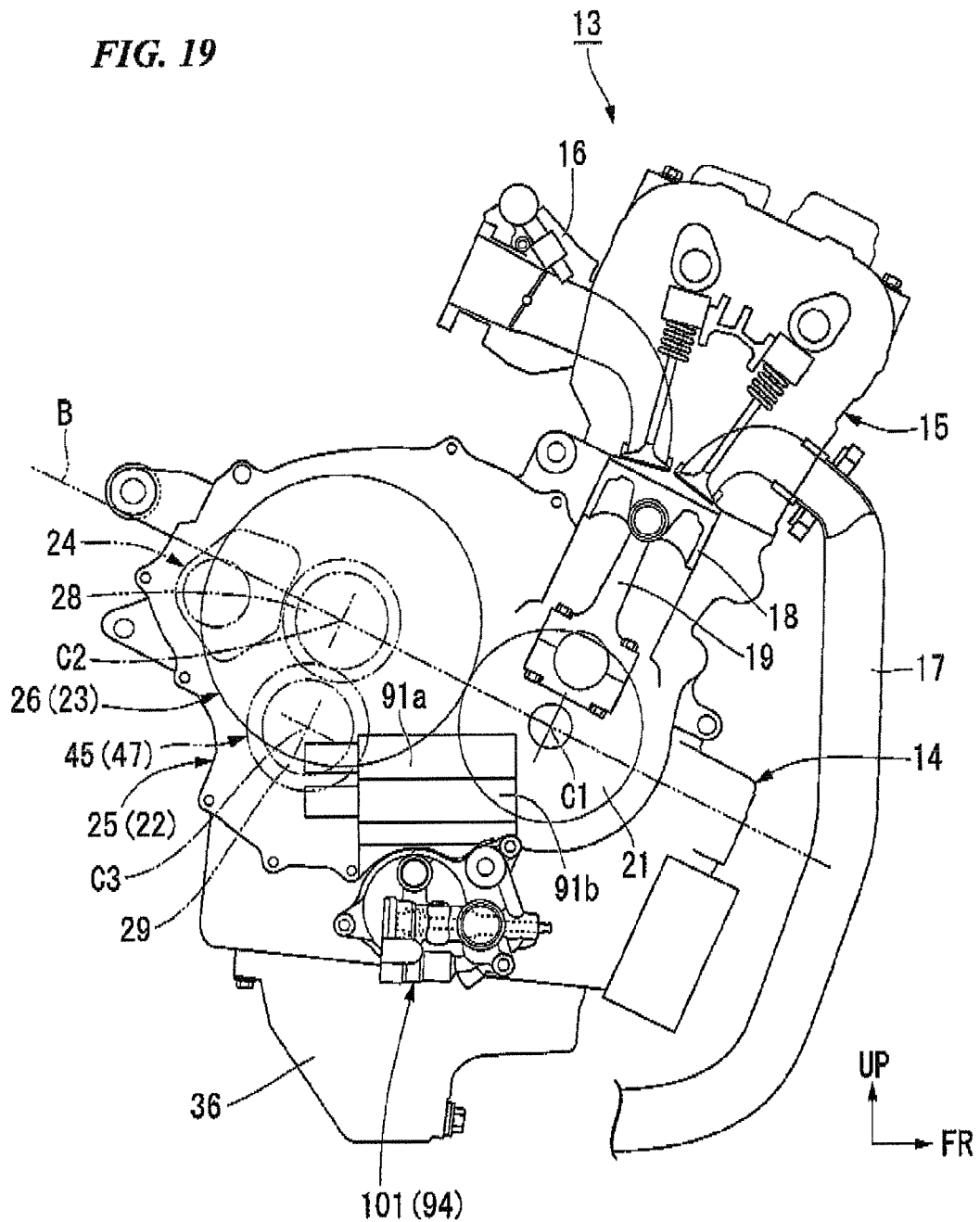
FIG. 19 is a drawing showing another modified example of a solenoid valve arrangement in the twin clutch transmission, being a side view corresponding to FIG. 10.
Figure 20:
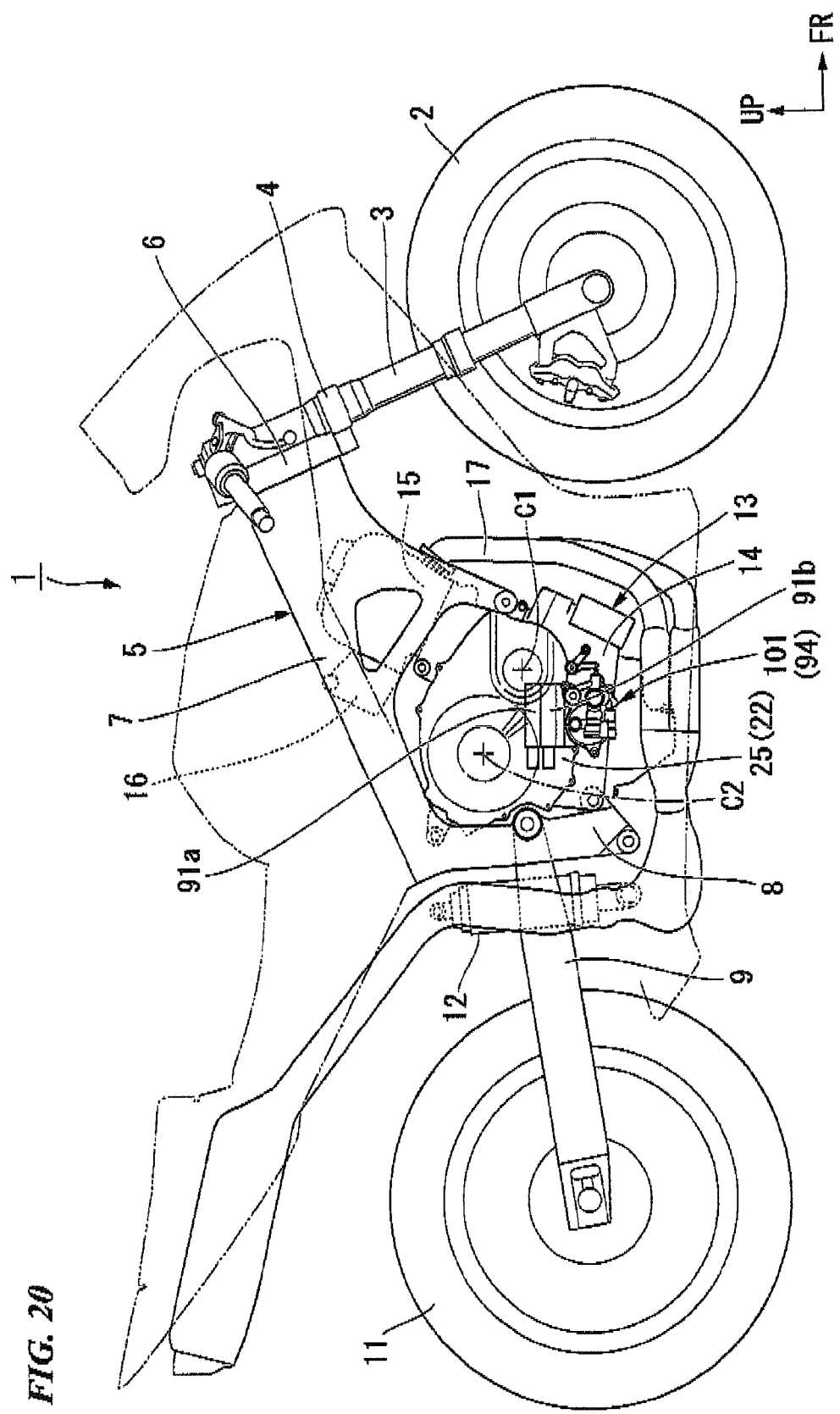
FIG. 20 is a right side view of the motorcycle with solenoid valves arranged therein as shown in FIG. 19.

Moreover, as shown in FIG. 19, the respective solenoid valves 91a and 91b are arranged on the same side as and in the vicinity of the twin clutch 26 and the hydraulic pressure cut-off device 94, and thereby it is possible to further simplify the hydraulic pressure supply passages. Also the respective solenoid valves 91a and 91b axe integrally provided with the hydraulic pressure cut-off device 94, thereby enabling reduction in the number of components and assembly steps. FIG. 20 shows a side view of a motorcycle for the case where the solenoid valves 91a and 91b are arranged as shown in FIG. 19.

Referring to FIG. 5 and FIG. 9, the hydraulic pressure relief oil passage 96a is formed so as to reach from the inner side of the cover 101a to the valve housing section 102 for the hydraulic pressure relief valve 95, and the hydraulic pressure relief oil passage 96b is formed so as to reach from the valve housing section 102 to the oil pan 36.

On the other hand, the hydraulic pressure switching oil passage 98a is formed so as to reach from a communicating section 108c with the primary oil feed passage 34 and through the returning side hydraulic chamber 107, to the valve housing section 103 for the switching valve 97, and the hydraulic pressure switching oil passage 98b is formed so as to reach from the valve housing section 103 to the relief side hydraulic chamber 106.

The hydraulic pressure switching valve 97 is a normally open type solenoid valve that opens the hydraulic pressure switching oil passages 98a and 98b when electric power is not applied, and that cuts off the hydraulic pressure switching passages 98a and 98b when electric power is applied.

When electric power is not applied to this hydraulic pressure switching valve 97, part of the hydraulic pressure from the first oil pump 31 is supplied to the returning side hydraulic chamber 107 and is also supplied to the relief side hydraulic chamber 106 though the valve housing section 103. The forward biasing force with respect to the hydraulic pressure relief valve 95 due to the hydraulic pressure supplied to the relief side hydraulic chamber 106 is greater than the backward biasing force with respect to the hydraulic pressure relief valve 95 due to the hydraulic pressure supplied to the returning side hydraulic chamber 107, and when the hydraulic pressure is supplied to the relief side hydraulic chamber 106, the hydraulic pressure relief valve 95 moves forward within the valve housing section 102. At this time, the hydraulic pressure relief oil passages 96a and 96b are opened, and the hydraulic pressure from the second oil pump 32 is returned to the oil pan 36.

On the other hand, when electric power is applied to the hydraulic pressure switching valve 97, the hydraulic pressure switching oil passages 98a and 98b are cut-off, and supply of the hydraulic pressure from the first oil pump 31 to the relief side hydraulic chamber 106 ceases. Consequently, the hydraulic pressure within the returning side hydraulic chamber 107 causes the hydraulic pressure relief valve 95 to move backward and the hydraulic pressure relief oil passages 96a and 96b are cutoff and it becomes possible to supply hydraulic pressure to the respective solenoid valves 91a and 91b without having the hydraulic pressure from the second oil pump 32 returned to the oil pan 36.

The hydraulic pressure cut-off device 94 is operation-controlled by the ECU 42 so that when starting the engine (when a starting switch ST (refer to FIG. 5) is operated), it opens the hydraulic pressure relief oil passages 96a and 96b and returns the engine oil discharged from the second oil pump 32 to the oil pan 36 (returns the hydraulic pressure), and when the engine has started (after complete explosion, and after engine revolution speed has stabilized at an idling revolution speed), it cuts off the hydraulic pressure relief oil passages 96a and 96b to enable supply of feed hydraulic pressure to the twin clutch 26. Start of traveling may be disabled when the side stand is pulled out, by opening the hydraulic pressure relief oil furnace 96.

That is to say, since the twin clutch 26 has a large capacity, and the rotation torque required at the time of engine start, and the load on the second oil pump 32 is high, then when starting the engine (in particular when the temperature is low), the respective clutches 51a and 51b are in the disengagement state and the pressure-boost operation of the second oil pump 32 is suppressed. As a result an increase in friction is suppressed to reduce the cranking load, and the startability of the engine is improved. Also miniaturization and weight reduction of the starter motor 27 and a battery (not shown in the drawing) is achieved.

Instead of having the configuration such that engine hydraulic pressure is added to both sides of the hydraulic pressure relief valve 95 as described above, the construction may be such that engine hydraulic pressure is given to one side and a spring reactive force is given to the other side. Moreover, as shown with chain lines on the right side in FIG. 9, there may be provided an operating mechanism 109 that operates the hydraulic pressure relief valve 95 with other external forces (an electronic actuator, manual operation, or the like). Furthermore, it is also possible to carry out a, control for cutting off feed hydraulic pressure to the twin clutch 26 with signals from the ECU 42 and so forth at times other than at the time of engine start (for example, when the side stand is pulled out as mentioned above, the vehicle topples over, a kill-switch is turned OFF, or the like).

As shown in FIG. 6, on the inner side of the clutch cover 69 there are arranged first, second, and third pipes 111, 112 and 113 spanning between this clutchcover 69 and the right end section of the main shaft 28 (inner shaft 43). The respective pipes 111, 112, and 113 are arranged coaxially with the main shaft 28, and are arranged in order from the inner circumferential side of first, second, and third, so as to be superposed while having a predetermined gap therebetween.

Inside the right side section of the inner shaft 43 there is formed a right hollow section 114 that expands the diameter thereof roughly in three steps towards the right. The right hollow section 114 is separated by a dividing wall, from the primary oil feed passage 71 that reaches from the left end opening thereof in the inner shaft 43 to the second clutch 51b vicinity, and into this right hollow section 114 there are inserted from the right end opening thereof; the left side section of the respective pipes 111, 112, and 113.

The left side outer circumference of the first pipe 111 is oil-tightly retained in the left side inner circumference of the right hollow section 114 via a sealing member 111a. The left side outer circumference of the second pipe 112 is oil-tightly retained in the intermediate section inner circumference of the right hollow section 114 via a sealing member 112a. The left side outer circumference of the third pipe 113 is oil-tightly retained in the right side inner circumference of the right hollow section 114 via a sealing member 113a.

Each right end section of the respective pipes 111, 112, and 113 is respectively oil-tightly inserted and retained in ring shaped holders 111b, 112b, and 113b. On the right end section of each of the pipes 111, 112, and 113 there is respectively formed a flange. On the right end section of the first pipe 111, the flange is supported in a state of being gripped between the holder 111b and the right outer wall 69a of the clutch cover 69. Moreover, the right end section of the second pipe 112 is such that the flange is supported in a state of being gripped between the holder 111b and the holder 112b, and the right end section of the third pipe 113 is such that the flange is supported in a state of being gripped between the holder 112b and the holder 113b. The holder 113b having the third pipe 113 inserted therethrough is fixed with a bolt on the right outer wall 69a of the clutch cover 69 from the inner side of the case, and thereby the respective holders 111b, 112b, and 113b and the respective pipes 111, 112, and 113 are fixed on the clutch cover 69.

A space within the first pipe 111 and ring-shaped spaces formed between the respective pipes 111, 112, and 113 form a plurality of in-shaft oil passages 115, 116, and 117 coaxially superposed within the main shaft 28.

Specifically, the space within the first pipe 111 functions as the first in-shaft oil passage 115, while the right end section thereof communicates with the first oil feed passage 92a connected to the clutch center position of the clutch cover 69, and the left end section thereof communicates with the engagement side hydraulic chamber 54b of the second clutch 51b via an engagement side oil passage 115a that passes through the inner and outer shafts 43 and 44 and the clutch center 57b substantially in the clutch radial direction.

Moreover, the space between the first pipe 111 and the second pipe 112 functions as the second in-shaft oil passage 116, while the right end section thereof communicates with an in-cover primary oil feed passage 71a formed within the clutch cover 69, and the left end section thereof communicates with the disengagement side hydraulic chamber 55a of the first clutch 51a via a disengagement side oil passage 116a that passes through the inner shaft 43 and the clutch center 57a substantially in the clutch radial direction. Hydraulic pressure from the first oil pump 31 is supplied to the in-cover primary oil feed passage 71a.

Furthermore, the space between the second pipe 112 and the third pipe 113 functions as the third in-shaft oil passage 117, while the right end section thereof communicates with the second oil feed passage 92b connected to a position on the clutch cover 69 offset from the clutch center, and the left end section thereof communicates with the engagement side hydraulic chamber 54a of the first clutch 51a via an engagement side oil passage 117a that passes through the inner shaft 43 and the clutch center 57a substantially in the clutch radial direction.

Moreover, the primary oil feed passage 71 in the inner shaft 43 is such that the right end section thereof communicates with the disengagement side hydraulic chamber 55b of the second clutch 51b via a disengagement side oil passage 118a that passes through the inner and outer shafts 43 and 44 and the clutch center 57b substantially in the clutch radial direction.

Here, the respective in-shaft oil passages 115, 116, and 117 on the right side of the inner shaft 43 are such that the capacity (sectional area) of the second in-shaft oil passage 116, in which a comparatively low hydraulic pressure acts, is smaller than the capacity of other in-shaft oil passages 115 and 117, in which a comparatively high hydraulic pressure acts. Similarly, the capacity of each of the disengagement side oil passages 116a and 118a is smaller than the capacity of the respective engagement side oil passages 115a and 117a.

Figure 10:
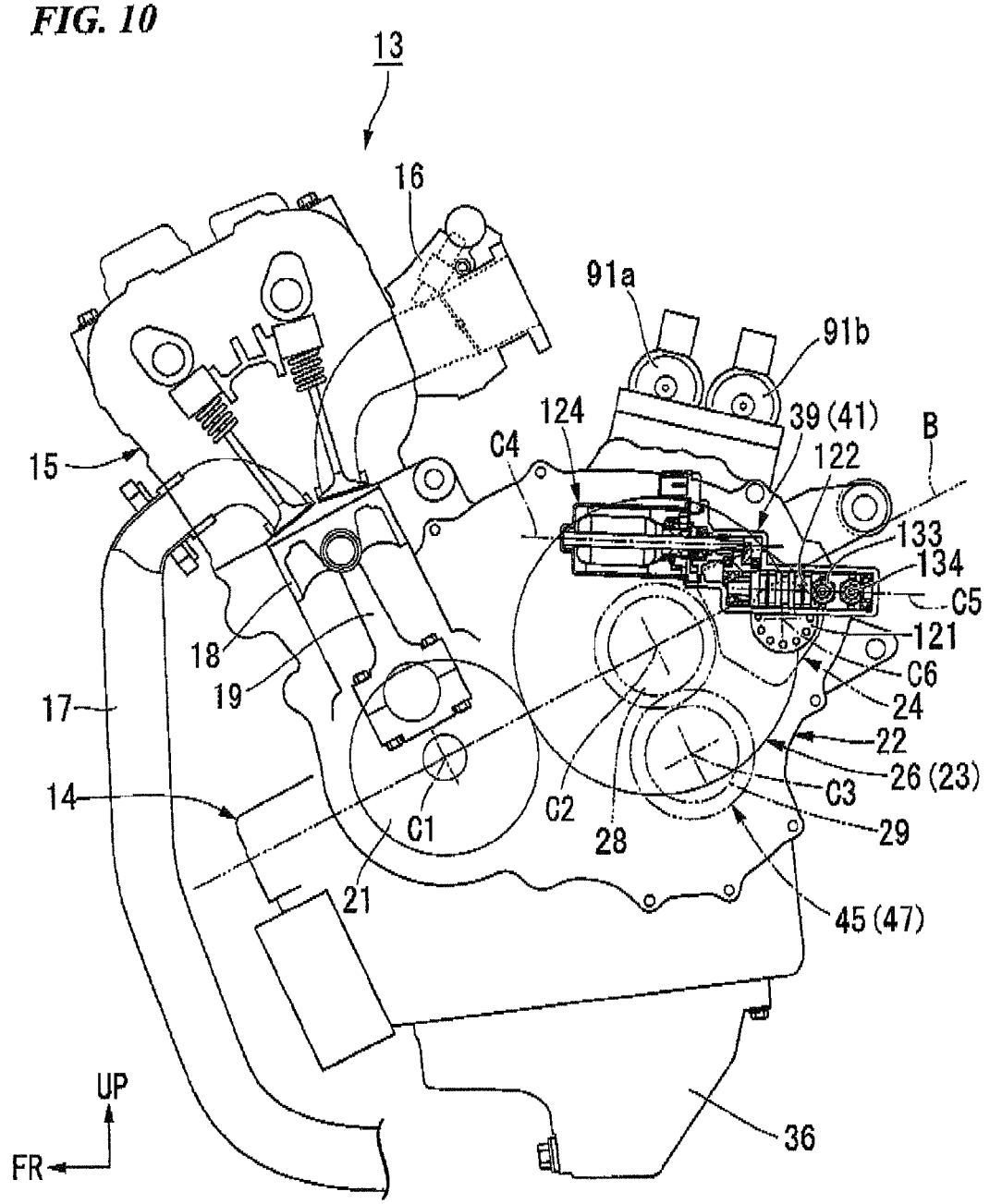
FIG. 10 is a left side view of the engine.

As shown in FIG. 10, on the left side of the upper section of the mission case 22 of the engine 13, there is arranged the driving mechanism 39 of the gear shift device 41.

Figure 11A:
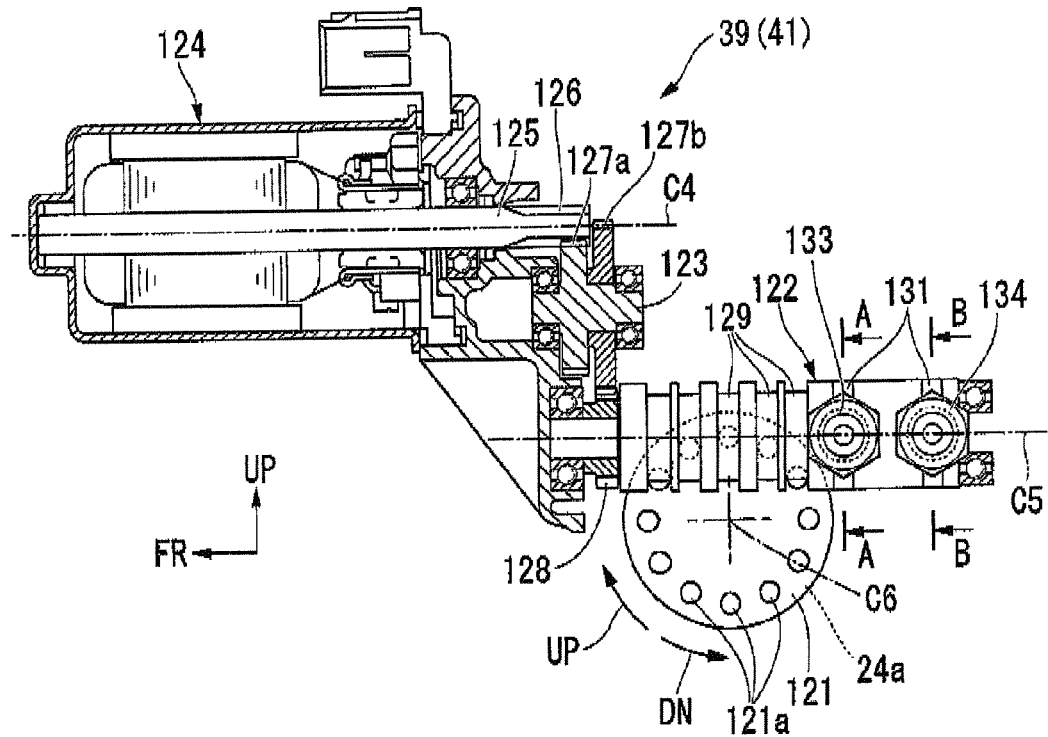
FIG. 11A is a sectional view of a gear shift device of the engine.
Figure 11B:
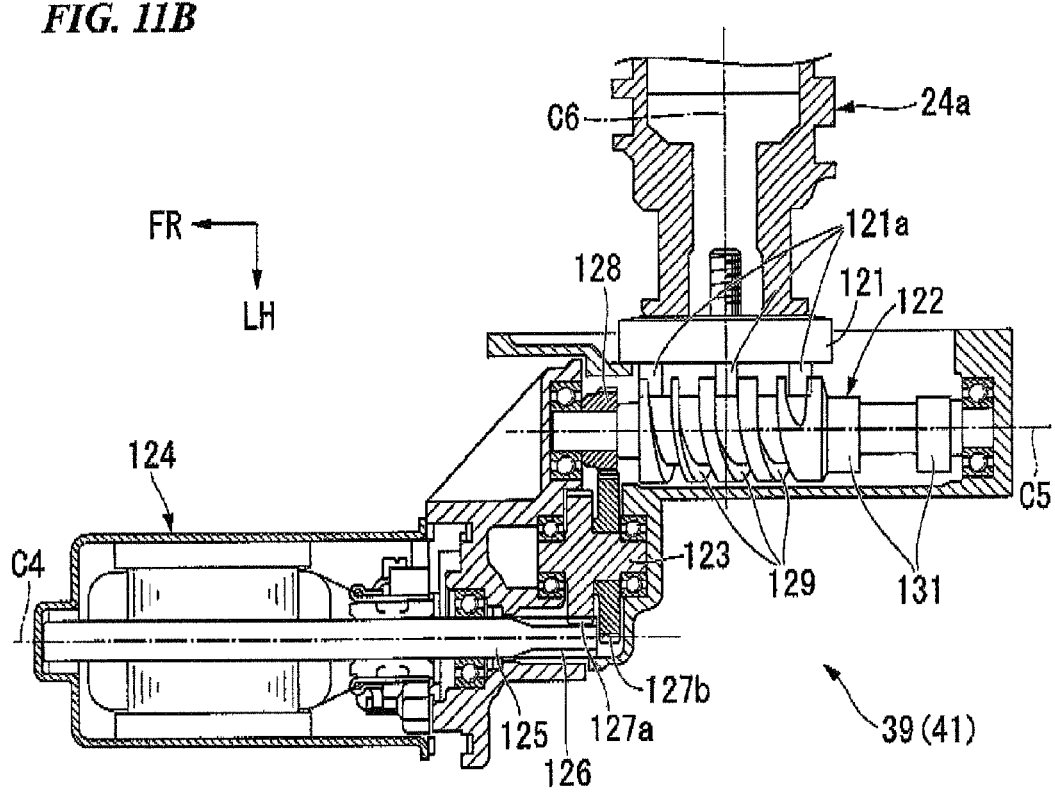
FIG. 11B is a sectional view of the gear shift device of the engine.

Also making reference to FIG. 11A and FIG. 11B, the driving mechanism 39 is such that it includes: a pin gear 121 coaxially fixed on the left end section of the shift drum 24a of the change mechanism 24; a worm barrel cam 122 that engages with this pin gear 121; and an electric motor 124 that gives rotational driving force to this barrel cam 122 via a relay gear shaft 123, and the shift drum 24a is rotated by drive of the electric motor 124 to thereby change the speed change stages of the transmission 47.

The electric motor 124 is arranged such that the rotational drive axis C4 thereof is along the front-rear direction, and a driving shaft 125 thereof projects towards the rear side. On the tip end section outer circumference of the driving shaft 125 there is formed a driving gear 126, and this driving gear 126 meshes with a first relay gear 127a of the relay gear shaft 123. A second relay gear 127b of this relay gear shaft 123 meshes with a driven gear 128 on the front section of the barrel cam 122. The barrel cam 122 has the rotational axis C5 parallel to the axis C4 of the electric motor 124, and on the front section outer circumference thereof there are formed cam grooves 129. The respective earn grooves 129 connect with each other so as to form a substantially single (or plurality of) thread groove, and part of a plurality of pins 121a projecting on the pin gear 121 engages with these cam grooves 129.

The pin gear 121 is such that the plurality of pins 121a at equal intervals in the circumferential direction on the left side of the disk shaped main body thereof project in parallel with the shift drum 24a. The rotational axis C5 of the barrel cam 122 is arranged perpendicular to the rotational axis C6 along the left-right direction in the pin gear 121 (shift drum 24a). The upper section of the pin gear 121 overlaps on the front section of the barrel cam 122 when seen in side view, and the respective pins 121a positioned on the upper section of the pin gear 121 respectively engage with the respective cam grooves 129 on the front section outer circumference of this barrel cam 122. At least one pair of each cam groove 129 and each pin 121a needs to engage with each other.

When the electric motor 124 is driven with control of the ECU 42, and the barrel cam 122 has rotated once in the normal rotation direction (arrow CW direction in FIG. 12A and FIG. 12B), each cam groove 129 is displaced to the rear by only one line (single pitch) in the arrangement direction thereof (front-rear direction), causing the pin gear 121 and the shift drum 24a to rotate in the shift up direction (arrow UP direction in FIG. 11A) by only an angle that corresponds to the single pitch. The rotational angle of the shift drum 24a at this time corresponds to the angle for shifting up the speed change stage of the transmission 47 by only one speed stage.

Similarly, when the electric motor 124 is driven and the barrel cam 122 has rotated once in the reverse rotation direction (arrow CCW direction in FIG. 12A and FIG. 12B), each cam groove 129 is displaced to the front by only a single pitch, causing the pin gear 121 and the shift drum 24a to rotate in the shift down direction (arrow DN direction in FIG. 11A) by only an angle that corresponds to the single pitch. The rotational angle of the shift drum 24a at this time corresponds to the angle for shifting down the speed change stage of the transmission 47 by only one speed stage.

The transmission 47 can establish a state where power transmission is possible respectively in: the current shift position (shift position in which power transmission is actually carried out via the twin clutch 26); and in a shift position on the side shifted-up or shifted-down by one speed stage from this shift position (shift position in which power transmission is cut-off via the twin clutch 26) (that is to say, in shift positions of the respective even speed stages and odd speed stages), except for the neutral state.

In such a transmission 47, if a shift-up by one speed stage is performed, then it is brought into a state where power transmission is possible respectively in the current shift position and in a shift position on the side shifted up by one speed stage. If a shift down by one speed stage is performed, then it is brought into a state where power transmission is possible respectively in the current shift position and in a shift position on the side shifted down by one speed stage. Which of the respective shift positions to be used by the transmission 47 to perform actual power transmission is switched, depending on which clutch the twin clutch 26 brings into an engagement state.

Figure 13A:
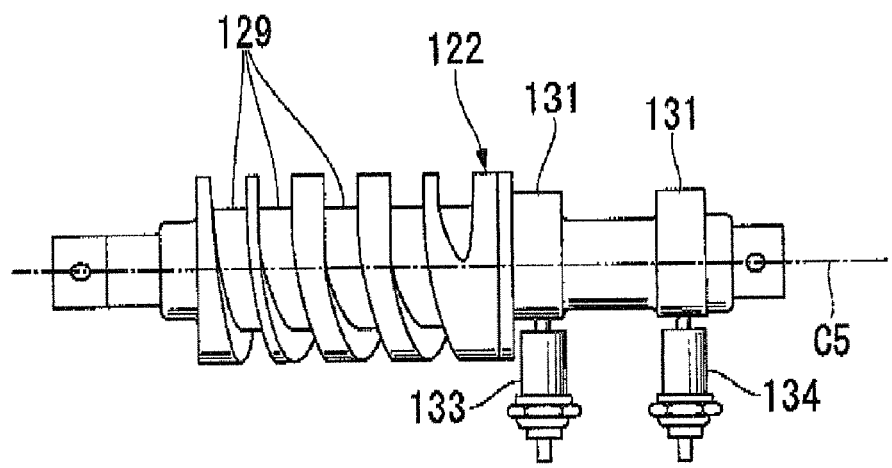
FIG. 13A is a side view of a barrel cam of the gear shift device.
Figure 13B:
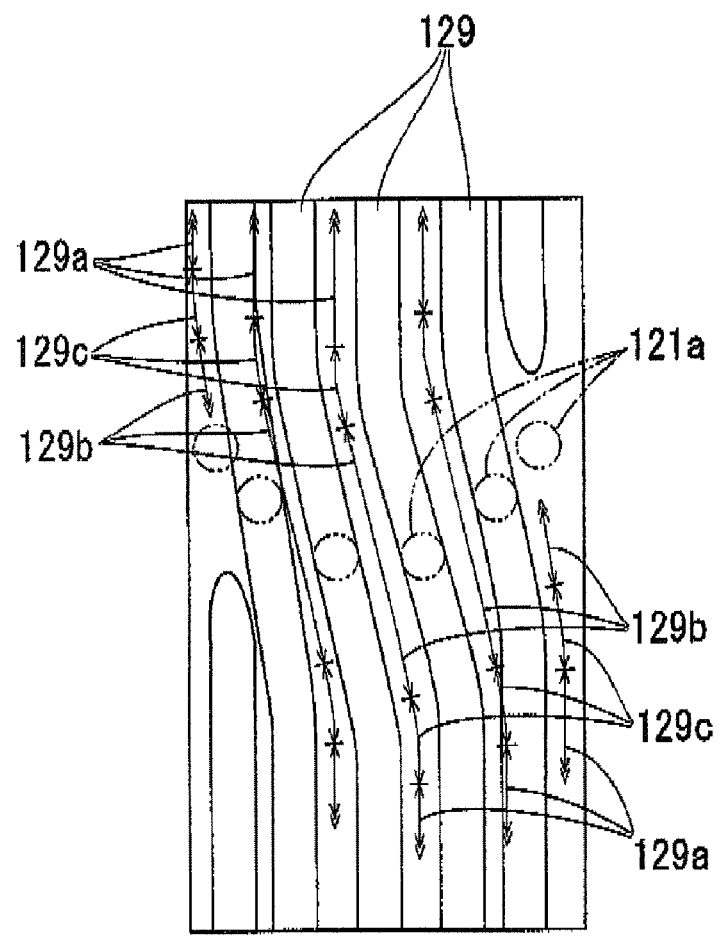
FIG. 13B is a development view of a cam groove on the outer circumference of the barrel cam.

As shown in FIG. 13B, each of the respective cam grooves 129 includes a holding range 129a in which a position in the barrel cam shaft direction (arrangement direction of each cam groove 129) is held constant, and a variable range 129b in which the position in the barrel cam shaft direction gradually changes. In a state where each of the pins 121a is engaged in the holding range 129a of each cam groove 129, the pin gear 121 and the shift drum 24a do not rotate even if the barrel cam 122 rotates, and in a state where each of the pins 121a is engaged in the variable range 129a of the cam groove 129, the pin gear 121 and the shift drum 24a rotate in the shift-up direction or in the shift down direction according to rotation of the barrel cam 122.

The holding range 129a and the variable range 129b in each cam groove 129 are smoothly connected via a curve section 129c. The curve sections 129c of the respective cam grooves 129 are arranged in an arc shape along the circumferential direction of the pin gear 121 (arrangement direction of the respective pins 121a). As a result, when the barrel cam 122 rotates the pin gear 121, the respective pins 121a smoothly and simultaneously enter from one of the ranges to another of the ranges of the respective cam grooves 129. Therefore rotation of the shift drum 24a becomes gentle and smooth, and the load on the pins 121a and the cam grooves 129 may also be reduced.

Figure 12A:
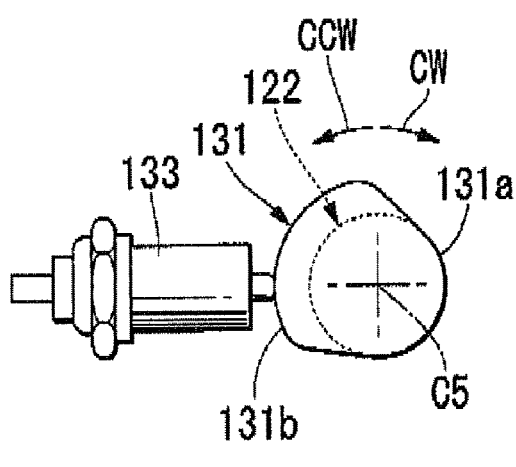
FIG. 12A is a sectional view on A-A in FIG. 11A.
Figure 12B:
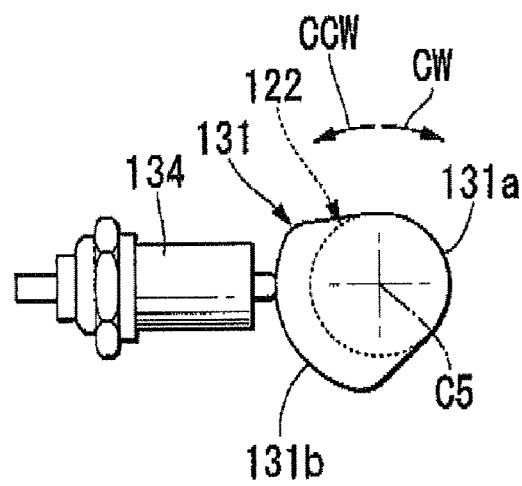
FIG. 12B is a sectional view on B-B in FIG. 11A.

As shown in FIG. 11A, FIG. 12A, and FIG. 12B, on the rear section outer circumference of the barrel cam 122, there are provided two switch cams 131 lined up in the front-rear direction. Moreover, for example, on the left side of each switch cam 131, there is provided a first switch 133 or a second switch 134, to the cam surface of which a switching piece faces. These switch cams 131 and the sensors 133 and 134 form the sensor S1 that detects the rotational position of the barrel cam 122.

The respective switch cams 131 have substantially the same shape when seen in the barrel cam axial direction, and on the outer circumference thereof there is formed a cam surface. The cam surface of each switch cam 131 has a reference surface 131a in a cylindrical shape coaxial with the barrel cam 122 and a similarly cylinder-shaped lift surface 131b having the diameter thereof expanded from that of the reference surface 131a, and the cam surface is formed with both of these smoothly connected surfaces. The respective switch cams 131 are arranged so that the lift surface formation ranges thereof mutually create a predetermined phase difference in the barrel cam rotational direction. Specifically, with respect to the switch cam 131 for the first switch 133, the switch cam 131 for the second switch 134 is arranged so as to be displaced by only a predetermined angle in the CCW direction.

The respective switches 133 and 134 detect the rotational status of the barrel cam 122 by advancing/retracting the switching pieces thereof in a case where the switching piece faces the reference surface 131a of each switch cam 131 (in a case where the respective switches 133 and 134 are turned OFF), and in a case where the switching piece faces the lift surface 131b of each switch earn 131 (in a case where the respective switches 133 and 134 are turned ON). The respective switches 133 and 134 are arranged so as to be in the same phase in the barrel cam rotational direction.

Figure 14:
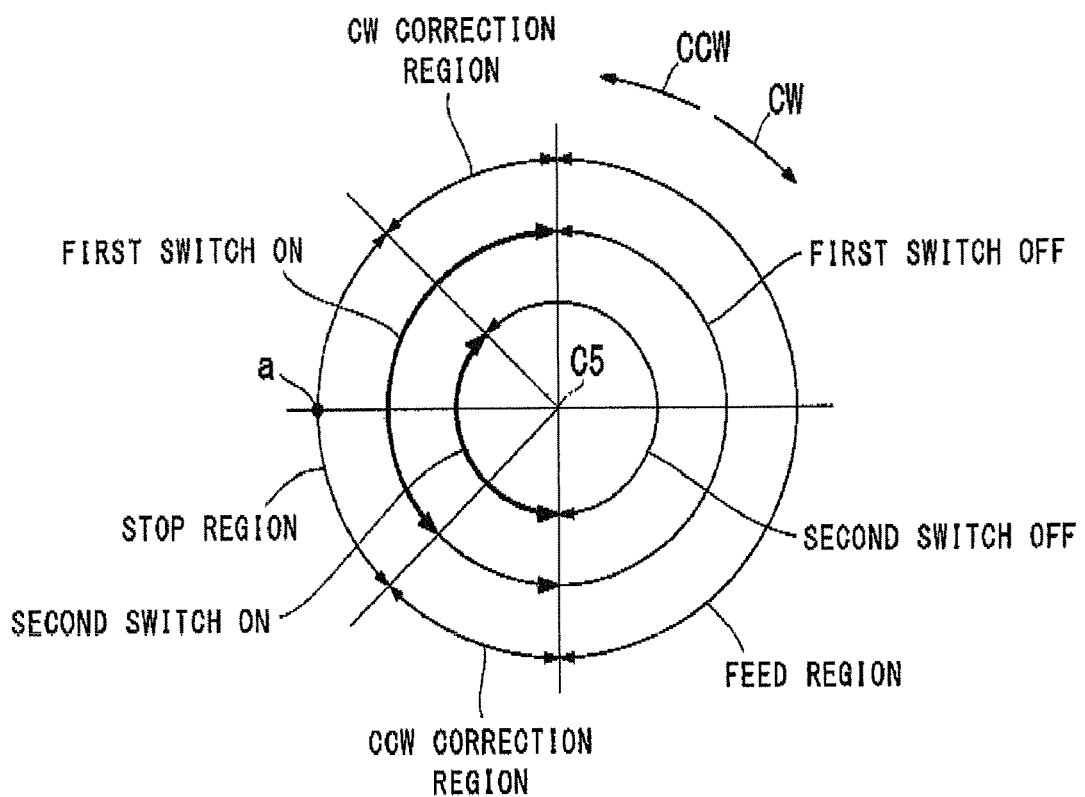
FIG. 14 is a diagram illustrating ON and OFF of first and second switches with respect to rotational angle of the barrel cam.

FIG. 14 is a diagram showing ON and OFF of the respective first and second switches 133 and 134 with respect to rotational angle of the barrel cam 122. A region where the lift surface 131b of each switch cam 131 faces a point "a", which is a detection position of the respective switches 133 and 134 (the region where the respective switches 133 and 134 are turned ON), signifies a stop region where the respective pins 121a of the pin gear 121 are present within the holding range 129a of the respective cam grooves 129 and the driving torque of the electric motor 124 is zero (refer to FIG. 15B).

At this time, by setting the transmission 47 so that it is brought into a state of having completed a speed changing operation, even a slight displacement in the rotational position of the barrel cam 122 does not affect the shift positions, and even if the driving torque of the electric motor 124 is zero, rotation of the shift drum 24a is restricted so as to be held in a predetermined shift position. The angle of the stop region is set to be equal to or greater than an angle through which the barrel cam 122 inertially rotates when the driving torque of the electric motor 124 is zero.

Figures 15A, 15B, 16:
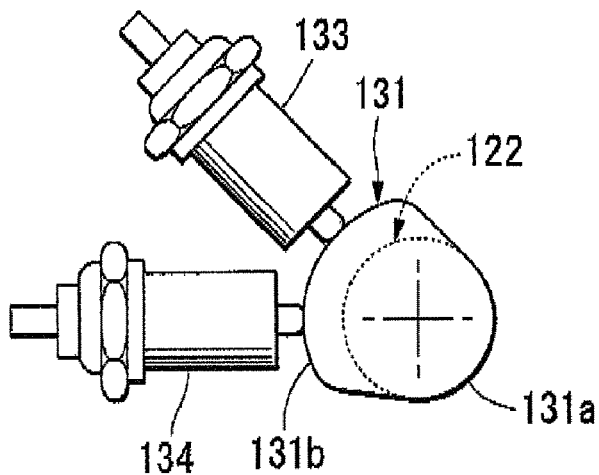
FIG. 15A is a table illustrating ON and OFF of the above respective switches with respect to rotational regions of the barrel cam.
FIG. 15B is a table showing torque of a barrel cam driving motor with respect to rotational regions of the barrel cam.
FIG. 16 is a drawing showing a modified example of an arrangement of the first and second sensors, being a sectional view corresponding to FIG. 12A and FIG. 12B.

On the other hand, a region where the reference surface 131a of each switch cam 131 faces the point "a" (the region where the respective switches 133 and 134 are turned OFF) signifies a feed region where the respective pins 121a of the pin gear 121 are present within the variable range 129b of the respective cam grooves 129 of the barrel cam 122 and the electric motor 124 is driven at normal torque (maximum torque±Tmax set by the system) (refer to FIG. 15B).

At this time the transmission 47 is in the process of the speed changing operation, and the shift drum 24a rotates in the shift up direction or in the shift down direction according to the rotation of the barrel cam 122. The angle of the feed region corresponds to the formation angle of the variable range 129b of the respective cam grooves 129 in the barrel cam 122.

A region where one of the lift surfaces 131b of the respective switch cams 131 faces the point "a" (the region where one of the respective switches 133 and 134 is turned ON) signifies a CW or CCW correction region where the respective pins 121a of the pin gear 121 are present in the vicinity of the end section of the holding range 129a of the respective cam grooves 129 of the barrel cam 122 and the electric motor 124 is driven at a small torque (the minimum torque±Tmin that overcomes the friction of the system) (refer to FIG. 15B).

Specifically, in the CCW correction region where only the second switch 134 having the phase displaced in the CCW direction of the barrel cam 122 is turned ON, correction is performed by driving the electric motor 124 at a minimum reverse rotation torque (−Tmin) for rotating the barrel cam 122 at a low torque in the CCW direction to set the stop region. Moreover, in the CW correction region where only the first switch 133 having the phase displaced in the CW direction of the barrel cam 122 is turned ON, correction is performed by driving the electric motor 124 at a minimum normal rotation torque (+Tmin) for rotating the barrel cam 122 at a low torque in the CW direction to set the stop region.

As shown in FIG. 16, the single switch cam 131 is provided in the barrel cam 122 to allow the cam surface of the switch cam 131 to face the two switches 133 and 134 so as to have the phase difference in the barrel cam rotational direction, and this enables the similar control as described above while reducing the number of switch cams. Moreover, the switches 133 and 134 are not limited to being formed as mechanical contact type switches, and may be formed as switches that use electric or magnetic power, or non-contact type switches.

Figure 17A:
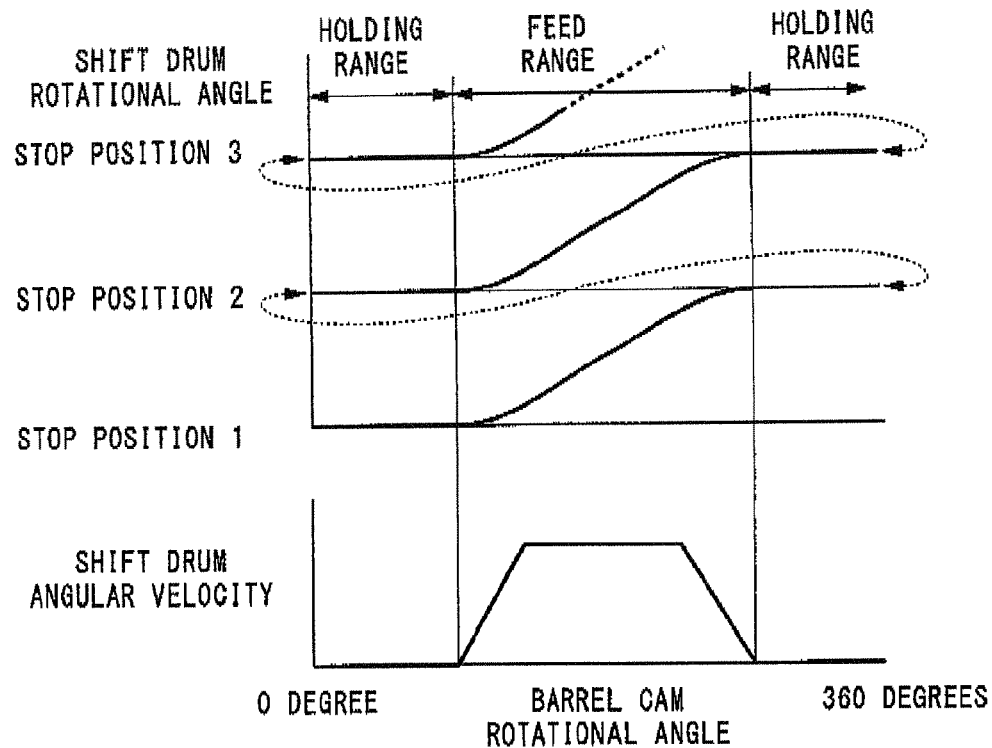
FIG. 17A is a graph showing rotational angle and angular velocity of a shift drum with respect to barrel cam rotational angle of the gear shift device, showing a case where the cam grooves are connected via a curve section.
Figure 17B:
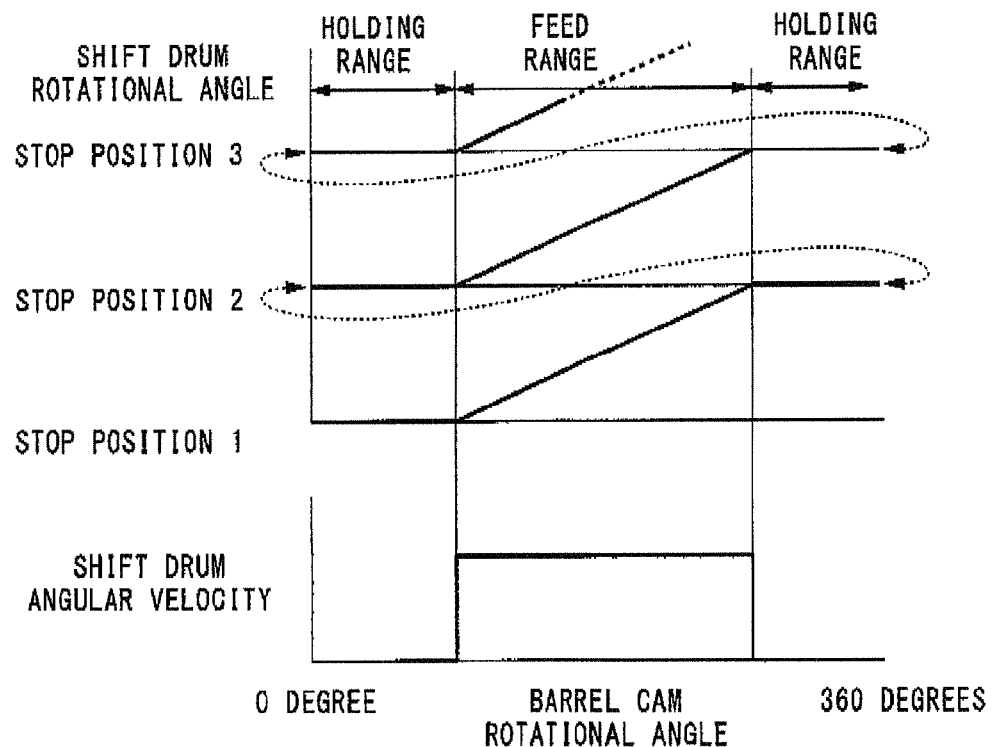
FIG. 17B is a graph showing rotational angle and angular velocity of a shift drum with respect to barrel cam rotational angle of the gear shift device, showing a case where the cam grooves are connected but not via a curve section.

FIG. 17A and FIG. 17B are graphs showing changes in the rotational angle and angular velocity of the shift drum 24a with respect to the rotational angle of the barrel cam 122. In the case where, as seen in the present embodiment, the respective ranges 129a and 129b of the respective cam grooves 129 of the barrel cam 122 are smoothly connected via the curve section 129c (refer to FIG. 17A), changes in rotational angle of the shift drum 24a become smoother, and the rise-up in rotational angle velocity of the shift drum 24a before and after the variable range 129b becomes smoother, compared to the case where the respective cam grooves 129 are connected so as to be bent between the respective ranges 129a and 129b but not via the curve section 129c (refer to FIG. 17B).

Therefore, the inertial torque of the shift drum 24a at the time of shift-up and shift-down is suppressed, and the load exerted on the respective components of the mechanism can be suppressed. Moreover, when the barrel cam 122 has rotated once, the rotational position thereof becomes the initial position of the shift position on the side one stage shifted up or shifted down, and it is possible to continuously perform speed change operations from this state.

As described above, the gear shift device 41 in the above embodiment that is used in the twin clutch transmission 23 of the engine 13, is provided with: the shift drum 24a that changes a speed change stage of the twin clutch transmission 23 according to a rotational position about an axis; the electric motor 124 having a driving shaft substantially orthogonal to this shift drum 24a; the worm shaped barrel cam 122 that is arranged parallel to the driving shaft of the electric motor 124 and that has a plurality of cam grooves 129 on the outer circumference; and the pin gear 121 that is coaxially fixed on the shift drum 24a and that has a plurality of pins 121a on the outer circumference. At least a pair of each pin 121a of the pin gear 121 and each cam groove 129 of the barrel cam 122 are engaged with each other, and the shift drum 24a is rotated by the electric motor 124 via the barrel cam 122 and the pin gear 121, to thereby change the speed change stage of the twin clutch transmission 23, and there is further provided a pair of switch cams 131 that detect the rotational position of the barrel cam 122, and first and second switches 133 and 134 that correspond to these.

According to this configuration, by detecting the rotational position of the shift drum 24a from the rotational position of the worm shaped barrel cam 122, the rotational position of the shift drum can 24a be detected efficiently without using an expensive sensor.

Moreover, in the above gear shift device 41, by providing the switch cams 131 integrally with the outer circumference of the barrel cam 122, and arranging the two mutually independent switches 133 and 134 corresponding to these switch cams 131 with a predetermined phase difference in the barrel cam rotational direction, it is possible to accurately detect if the barrel cam 122 has rotated to the shift up side or the shift down side, or if shift up or shift down has been completed.

The present invention is not limited to the above embodiment, and may be applied to various types of internal combustion engines such as; a single cylinder engine, a V-type engine, and a longitudinal type engine having the crankshaft axis along the front-rear direction. Moreover, the present invention may also be applied to a three- or four-wheeled saddle-ride type vehicle, or to a scooter type vehicle having a low-floor footstool section, in addition to motorcycles.

The configuration in the above embodiment is an example of the present invention, and may also be applied to a four-wheeled passenger vehicle. Furthermore, various kinds of modifications may be made without departing from the scope of the invention.

INDUSTRIAL APPLICABILITY

It is possible to provide a gear shift device in which the rotational position of the shift drum can be detected efficiently while keeping cost down.

The invention claimed is:

1. A gear shift device used in a transmission of an engine, comprising:
   a shift drum that changes a speed change stage of the transmission according to a rotational position about an axis;
   an actuator having a driving shaft substantially orthogonal to the shift drum;
   a worm shaped barrel cam that is arranged parallel to the driving shaft of the actuator and that has a plurality of cam grooves on an outer circumference thereof; and
   a wheel gear that is coaxially fixed on the shift drum and that has a plurality of pins on an outer circumference thereof, wherein:
   at least a pair of each pin of the wheel gear and each cam groove of the barrel cam are engaged with each other, and the shift drum is rotated by the actuator via the barrel cam and the wheel gear, to thereby change the speed change stage of the transmission; and
   the gear shift device further comprises a detection device that detects a rotational position of the barrel cam; and
   the detection device has a cam provided integral with an outer circumference of the barrel cam.

2. The gear shift device according to claim 1, wherein the detection device has two independent sensors corresponding to the cam, which are arranged with a predetermined phase difference along a rotational direction of the barrel cam.

* * * * *